United States Patent
Mukherjee et al.

(10) Patent No.: US 10,708,947 B2
(45) Date of Patent: Jul. 7, 2020

(54) TIMING ADVANCE IN LBT SYSTEMS

(71) Applicant: Telefonaktiebolaget LM Ericsson (publ), Stockholm (SE)

(72) Inventors: Amitav Mukherjee, Fremont, CA (US); Yu Yang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1 day.

(21) Appl. No.: 15/781,551

(22) PCT Filed: Dec. 1, 2016

(86) PCT No.: PCT/SE2016/051194
§ 371 (c)(1),
(2) Date: Jun. 5, 2018

(87) PCT Pub. No.: WO2017/099650
PCT Pub. Date: Jun. 15, 2017

(65) Prior Publication Data
US 2019/0313450 A1 Oct. 10, 2019

Related U.S. Application Data

(60) Provisional application No. 62/266,386, filed on Dec. 11, 2015.

(51) Int. Cl.
*H04W 4/00* (2018.01)
*H04W 74/08* (2009.01)
(Continued)

(52) U.S. Cl.
CPC ....... *H04W 74/0808* (2013.01); *H04W 16/14* (2013.01); *H04W 56/0045* (2013.01); *H04W 72/0446* (2013.01); *H04W 72/0453* (2013.01)

(58) Field of Classification Search
CPC ...... H04W 72/04; H04W 88/08; H04W 76/00
See application file for complete search history.

(56) References Cited

U.S. PATENT DOCUMENTS

2007/0254656 A1 11/2007 Dalsgaard
2015/0085839 A1* 3/2015 Bergstrom ........ H04W 56/0045
370/336

(Continued)

FOREIGN PATENT DOCUMENTS

WO 2013126858 A1 8/2013
WO 2015169397 A1 11/2015

OTHER PUBLICATIONS

Author Unknown, "Technical Specification Group Radio Access Network; Evolved Universal Terrestrial Radio Access (E-UTRA); Physical channels and modulation (Release 12)," Technical Specification 36.211, Version 12.3.0, 3GPP Organizational Partners, Sep. 2014, 124 pages.

(Continued)

*Primary Examiner* — Siren Wei
(74) *Attorney, Agent, or Firm* — Withrow & Terranova, PLLC

(57) ABSTRACT

Systems and methods relating to a Timing Advance (TA) in a Listen-Before-Talk (LBT) cell are disclosed. In some embodiments, a method of operation of a radio access node in a cellular communications network comprises transmitting an indication of a TA for uplink LBT for a LBT cell to be used by a wireless device. In this manner, timing of the uplink LBT procedure can be controlled such that at least a portion of the LBT duration occurs during a time period in which downlink transmission on the LBT cell does not interfere with the LBT procedure.

19 Claims, 22 Drawing Sheets

UL LBT AFTER RECEPTION OF DL BURST AND UL TRANSMISSION TA

(51) Int. Cl.
*H04W 16/14* (2009.01)
*H04W 56/00* (2009.01)
*H04W 72/04* (2009.01)

(56) References Cited

U.S. PATENT DOCUMENTS

| 2016/0278050 | A1* | 9/2016 | Nory ................. H04L 27/0006 |
| 2017/0013646 | A1 | 1/2017 | Uchino et al. |
| 2017/0085346 | A1* | 3/2017 | Tiirola ................. H04L 5/0001 |
| 2017/0150500 | A1* | 5/2017 | Ahn .................... H04W 28/02 |

OTHER PUBLICATIONS

Author Unknown, "Technical Specification Group Radio Access Network; Evolved Universal Terrestrial Radio Access (E-UTRA); Multiplexing and channel coding (Release 12)," Technical Specification 36.212, Version 12.6.0, 3GPP Organizational Partners, Sep. 2015, 95 pages.

Author Unknown, "Technical Specification Group Radio Access Network; Evolved Universal Terrestrial Radio Access (E-UTRA); Physical layer procedures (Release 12)," Technical Specification 36.213, Version 12.3.0, 3GPP Organizational Partners, Sep. 2014, 212 pages.

Author Unknown, "Technical Specification Group Radio Access Network; Evolved Universal Terrestrial Radio Access (E-UTRA); Medium Access Control (MAC) protocol specification (Release 12)," Technical Specification 36.321, Version 12.1.0, 3GPP Organizational Partners, Mar. 2014, 57 pages.

LG Electronics, "R1-144900: LBT operation details and initial evaluation results," Third Generation Partnership Project (3GPP), TSG RAN WG1 Meeting #79, Nov. 17-21, 2014, 7 pages, San Francisco, USA.

Nokia, "Cell-specific TA for MF," MFA-TSG Meeting #6, Sep. 6-9, 2016, 5 pages, Villarceaux, France.

ZTE, "R1-150156: Analysis on potential issues and solutions for LAA UL transmission," Third Generation Partnership Project (3GPP), TSG RAN WG1 Meeting #80, Feb. 9-13, 2015, 6 pages, Athens, Greece.

International Search Report and Written Opinion for International Patent Application No. PCT/SE2016/051194, dated Feb. 13, 2017, 12 pages.

Huawei et al., "R1-153789: LAA DL design impact for forward compatibility with LAA UL," 3GPP TSG RAN WG1 meeting #82, Aug. 24-28, 2015, Beijing, China, 3 pages.

Samsung, "R1-156768: Discussion on LBT for UL transmission," 3GPP TSG RAN WG1 Meeting #83, Nov. 15-22, 2015, Anaheim, USA, 6 pages.

Extended European Search Report for European Patent Application No. 16873459.8, dated May 23, 2019, 8 pages.

LG Electronics, "R1-156858: UL LBT design in LAA," Third Generation Partnership Project (3GPP) TSG RAN WG1 Meeting #83, Nov. 15-22, 2015, Anaheim, California, USA, 6 pages.

Motorola Mobility, "R1-155943: UL Channel Access for LAA," Third Generation Partnership Project (3GPP) TSG RAN WG1 Meeting #82bis, Oct. 5-9, 2015, Malmo, Sweden, 4 pages.

Notification of Reasons for Refusal for Japanese Patent Application No. 2018-529941, dated Nov. 30, 2018, 6 pages.

\* cited by examiner

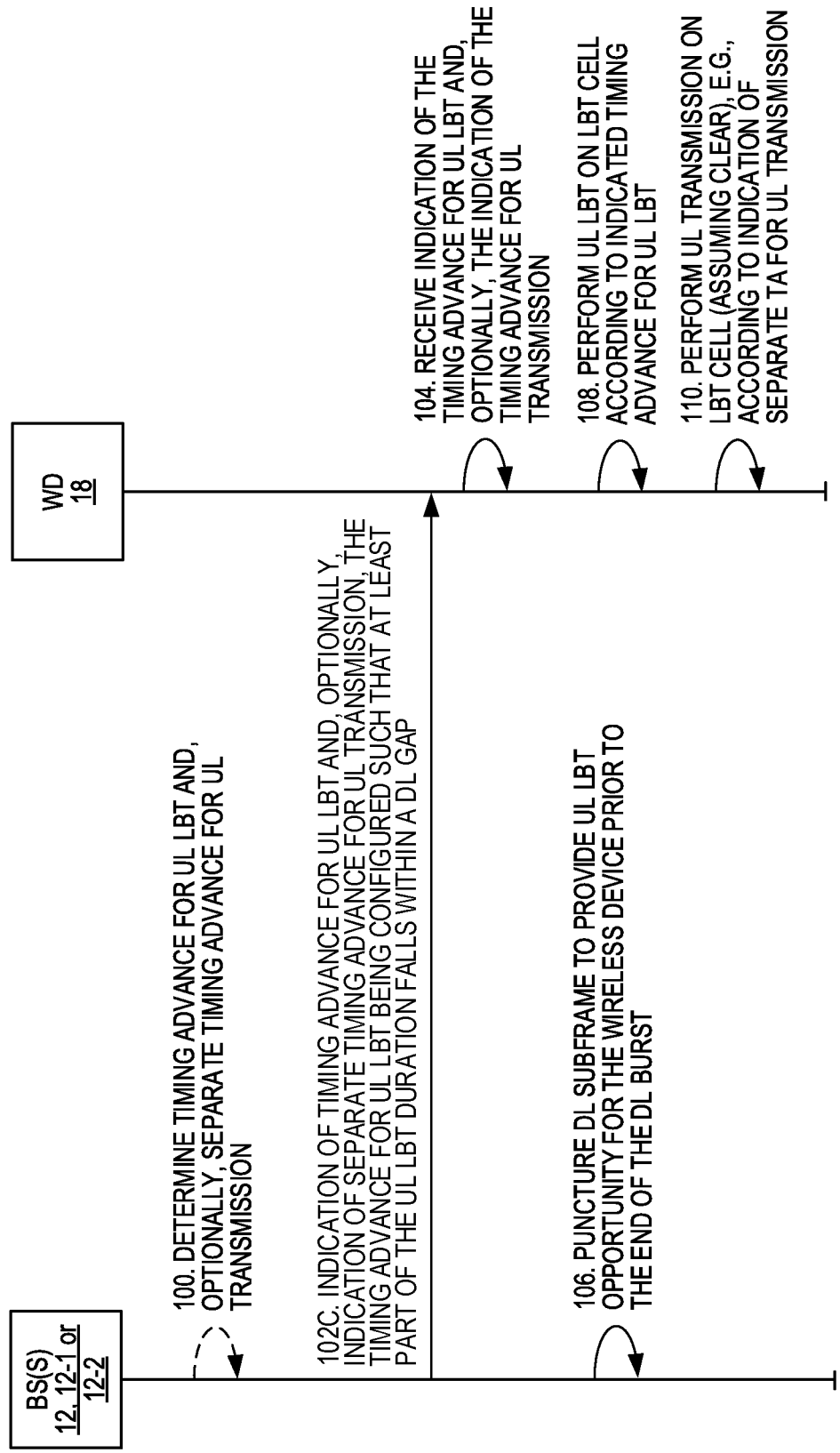

TIMING ADVANCE IN LBT SYSTEMS

RELATED APPLICATIONS

This application is a 35 U.S.C. § 371 national phase filing of International Application No. PCT/SE2016/051194, filed Dec. 1, 2016, which claims the benefit of provisional patent application Ser. No. 62/266,386, filed Dec. 11, 2015, the disclosures of which are hereby incorporated herein by reference in their entireties.

TECHNICAL FIELD

The present disclosure relates to License Assisted Access (LAA), Listen-Before-Talk (LBT), multi-carrier LBT, and MuLTEfire. The proposed changes may affect L1 and L2.

BACKGROUND

The Third Generation Partnership Program (3GPP) Release (Rel) 13 feature License Assisted Access (LAA) allows Long Term Evolution (LTE) equipment to also operate in the unlicensed 5 gigahertz (GHz) radio spectrum. The unlicensed 5 GHz spectrum is used as a complement to the licensed spectrum. A future Rel-14 work item will add uplink transmissions to LAA. Accordingly, devices connect in the licensed spectrum (Primary Cell (PCell)) and use Carrier Aggregation (CA) to benefit from additional transmission capacity in the unlicensed spectrum (Secondary Cell (SCell)). Standalone operation of LTE in unlicensed spectrum is also possible and is under development by the MuLTEfire Alliance.

Regulatory requirements, however, may not permit transmissions in the unlicensed spectrum without prior channel sensing. Since the unlicensed spectrum must be shared with other radios of similar or dissimilar wireless technologies, a so called Listen-Before-Talk (LBT) method needs to be applied. LBT involves sensing the medium for a predefined minimum amount of time and backing off if the channel is busy. Today, the unlicensed 5 GHz spectrum is mainly used by equipment implementing the IEEE 802.11 Wireless Local Area Network (WLAN) standard. This standard is known under its marketing brand "Wi-Fi."

LTE

LTE uses Orthogonal Frequency Division Multiplexing (OFDM) in the downlink and Discrete Fourier Transform (DFT)-spread OFDM (also referred to as single-carrier Frequency Division Multiple Access (FDMA)) in the uplink. The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing as the downlink and the same number of Single Carrier FDMA (SC-FDMA) symbols in the time domain as OFDM symbols in the downlink.

In the time domain, LTE downlink transmissions are organized into radio frames of 10 milliseconds (ms), each radio frame consisting of ten equally-sized subframes of length $T_{SUBFRAME}=1$ ms as shown in FIG. 2. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 microseconds (µs).

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3, or 4 OFDM symbols in each subframe and the number n=1, 2, 3, or 4 is known as the Control Format Indicator (CFI). The downlink subframe also contains common reference symbols, which are known to the receiver and are used for coherent demodulation of, e.g., the control information. A downlink system with CFI=3 OFDM symbols as control is illustrated in FIG. 3. The reference symbols shown there are the Cell specific Reference Symbols (CRSs) and are used to support multiple functions including fine time and frequency synchronization and channel estimation for certain transmission modes.

Uplink transmissions are dynamically scheduled, i.e., in each downlink subframe the base station transmits control information about which terminals should transmit data to the enhanced or evolved Node B (eNB) in subsequent subframes, and upon which resource blocks the data is transmitted. The uplink resource grid is comprised of data and uplink control information in the Physical Uplink Shared Channel (PUSCH), uplink control information in the Physical Uplink Control Channel (PUCCH), and various reference signals such as Demodulation Reference Signals (DMRSs) and Sounding Reference Signals (SRSs). DMRSs are used for coherent demodulation of PUSCH and PUCCH data, whereas SRS is not associated with any data or control information but is generally used to estimate the uplink channel quality for purposes of frequency-selective scheduling. An example uplink subframe is shown in FIG. 4. Note that uplink DMRS and SRS are time-multiplexed into the uplink subframe, and SRSs are always transmitted in the last symbol of a normal uplink subframe. The PUSCH DMRS is transmitted once every slot for subframes with normal cyclic prefix, and is located in the fourth and eleventh SC-FDMA symbols.

From LTE Rel-11 onwards, downlink or uplink resource assignments can also be scheduled on the enhanced Physical Downlink Control Channel (EPDCCH). For Rel-8 to Rel-10 only the Physical Downlink Control Channel (PDCCH) is available. Resource grants are User Equipment (UE) specific and are indicated by scrambling the Downlink Control Information (DCI) Cyclic Redundancy Check (CRC) with the UE-specific Cell Radio Network Temporary Identity (C-RNTI) identifier.

LTE Uplink Timing Advance

Uplink transmissions from different UEs will arrive at different times at the eNB due to differences in propagation delay. In order to maintain uplink orthogonality, a UE-specific uplink Timing Advance (TA) is indicated to UEs in order to align the reception times of their transmissions at the eNB. The uplink TA is specified relative to the downlink reception timing for the UE. For initial access, the TA is computed by the eNB after a preamble transmission step by the UE. After initial access, the eNB can readjust uplink TA with TA commands. The TA can be configured by the eNB using an 11-bit command with a granularity of 0.52 µs, from 0 up to a maximum of 0.67 ms. An illustration of uplink TA is shown in FIG. 5, where UE 1 and UE 2 apply a TA of twice their respective one-way propagation delays from the eNB, such that both uplink transmissions are aligned in time when received by the eNB.

The eNB configures a timer for each UE, which is restarted by the UE each time a TA update command is received. If the UE does not receive another TA update command before the timer expires, it must then consider its uplink to have lost synchronization. In such a case, the UE is not permitted to make another uplink transmission of any sort without first transmitting a random access preamble to reinitialize the uplink timing.

CA

The LTE Rel-10 standard supports bandwidths larger than 20 megahertz (MHz). One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments it can be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. The straightforward way to obtain this would be by means of CA. CA implies that an LTE Rel-10 terminal can receive multiple CCs, where the CCs have, or at least the possibility to have, the same structure as a Rel-8 carrier. CA is illustrated in FIG. 6. A CA-capable UE is assigned a PCell which is always activated, and one or more SCells which may be activated or deactivated dynamically.

The number of aggregated CCs as well as the bandwidth of the individual CC may be different for uplink and downlink. A symmetric configuration refers to the case where the number of CCs in downlink and uplink is the same whereas an asymmetric configuration refers to the case where the number of CCs is different. It is important to note that the number of CCs configured in a cell may be different from the number of CCs seen by a terminal. A terminal may, for example, support more downlink CCs than uplink CCs, even though the cell is configured with the same number of uplink and downlink CCs.

WLAN

In typical deployments of WLAN, Carrier Sense Multiple Access with Collision Avoidance (CSMA/CA) is used for medium access. This means that the channel is sensed to perform a Clear Channel Assessment (CCA), and a transmission is initiated only if the channel is declared as Idle. In case the channel is declared as Busy, the transmission is essentially deferred until the channel is deemed to be Idle.

A general illustration of the LBT mechanism of Wi-Fi is shown in FIG. 7. After a Wi-Fi station A transmits a data frame to a station B, station B shall transmit the Acknowledgement (ACK) frame back to station A with a delay of 16 μs. Such an ACK frame is transmitted by station B without performing an LBT operation. To prevent another station interfering with such an ACK frame transmission, a station shall defer for a duration of 34 μs (referred to as Distributed Inter-Frame Space (DIFS)) after the channel is observed to be occupied before assessing again whether the channel is occupied. Therefore, a station that wishes to transmit first performs a CCA by sensing the medium for a fixed duration DIFS. If the medium is idle, then the station assumes that it may take ownership of the medium and begin a frame exchange sequence. If the medium is busy, the station waits for the medium to go idle, defers for DIFS, and waits for a further random backoff period.

In the above basic protocol, when the medium becomes available, multiple Wi-Fi stations may be ready to transmit, which can result in collision. To reduce collisions, stations intending to transmit select a random backoff counter and defer for that number of slot channel idle times. The random backoff counter is selected as a random integer drawn from a uniform distribution over the interval of [0, CW]. The default size of the random backoff contention window (CWmin) is set in the IEEE specs. Note that collisions can still happen even under this random backoff protocol when there are many stations contending for the channel access. Hence, to avoid recurring collisions, the backoff contention window size (CW) is doubled whenever the station detects a collision of its transmission up to a limit (CWmax), also set in the IEEE specs. When a station succeeds in a transmission without collision, it resets its random backoff contention window size back to the default value (CWmin).

LAA to Unlicensed Spectrum Using LTE

Up to now, the spectrum used by LTE is dedicated to LTE. This has the advantage that the LTE system does not need to care about the coexistence issue and spectrum efficiency can be maximized. However, the spectrum allocated to LTE is limited, which cannot meet the ever increasing demand for larger throughput from applications/services. Therefore, a new study item has been initiated in 3GPP on extending LTE to exploit unlicensed spectrum in addition to licensed spectrum. Unlicensed spectrum can, by definition, be simultaneously used by multiple different technologies. Therefore, LTE needs to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects the channel is occupied.

Furthermore, one way to utilize the unlicensed spectrum reliably is to transmit essential control signals and channels on a licensed carrier. That is, as shown in FIG. 8, a UE is connected to a PCell in the licensed band and one or more SCells in the unlicensed band. In this application a SCell in unlicensed spectrum is denoted as an LAA SCell.

LBT in 3GPP Rel-13 LAA

In Rel-13 LAA, LBT for downlink data transmissions follow a random backoff procedure similar to that of Wi-Fi, with Contention Window (CW) adjustments based on Hybrid Automatic Repeat Request (HARQ) Negative Acknowledgement (NACK) feedback. Several aspects of uplink LBT were discussed during Rel-13. With regard to the framework of uplink LBT, the discussion focused on the self-scheduling and cross-carrier scheduling scenarios. Uplink LBT imposes an additional LBT step for uplink transmissions with self-scheduling, since the uplink grant itself requires a downlink LBT by the eNB. The uplink LBT maximum CW size should then be limited to a very low value to overcome this drawback, if random backoff is adopted. Therefore, Rel-13 LAA recommended that the uplink LBT for self-scheduling should use either a single CCA duration of at least 25 μs (similar to downlink Dedicated Reference Signal (DRS)), or a random backoff scheme with a defer period of 25 μs including a defer duration of 16 μs followed by one CCA slot, and a maximum contention window size chosen from X={3, 4, 5, 6, 7}. These options are also applicable for cross-carrier scheduling of uplink by another unlicensed SCell.

A short uplink LBT procedure for the case involving cross-carrier scheduling by a licensed PCell remains open for further study. The other option on the table is a full-fledged random backoff procedure similar to that used by Wi-Fi stations.

Finally, the case of uplink transmissions without LBT when an uplink transmission burst follows a downlink transmission burst on that respective carrier (with a gap of at most 16 μs between the two bursts) was left open for further study in Rel-14.

An example to illustrate uplink LBT and uplink transmission when the uplink grant is sent on an unlicensed carrier is provided in FIG. 9.

SUMMARY

Systems and methods relating to a timing advance in a Listen-Before-Talk (LBT) cell are disclosed. In some embodiments, a method of operation of a radio access node in a cellular communications network comprises transmitting an indication of a Timing Advance (TA) for uplink LBT for a LBT cell to be used by a wireless device. In this manner, timing of the uplink LBT procedure can be controlled such that at least a portion of the LBT duration occurs during a time period in which downlink transmission on the LBT cell does not interfere with the LBT procedure.

In some embodiments, the TA for uplink LBT for the LBT cell is a TA for both uplink LBT and uplink transmission for the LBT cell.

In some embodiments, the method further comprises sending, to the wireless device, an indication of a TA for uplink transmission on the LBT cell.

In some embodiments, the method further comprises determining the TA for uplink LBT for the LBT cell based on a one-way propagation delay ($T_1$) between a radio access node providing the LBT cell and the wireless device, where the TA for uplink LBT is greater than $2T_1$ and is relative to a downlink timing of the wireless device.

In some embodiments, determining the TA for uplink LBT comprises determining the TA for uplink LBT based on the one-way propagation delay ($T_1$) and an amount of time needed to perform an uplink LBT procedure on the LBT cell, where the TA for uplink LBT is greater than or equal to $2T_1$ plus the amount of time needed to perform an uplink LBT procedure on the LBT cell.

In some embodiments, a last downlink subframe of a downlink burst on the LBT cell consists of a used portion of duration $D_{used}$ that corresponds to a partial downlink subframe and an unused portion of duration $D_{unused}$ that occurs after the partial downlink subframe, and determining the TA for uplink LBT comprises determining the TA for uplink LBT based on: (a) the one-way propagation delay ($T_1$), (b) an amount of time needed to perform an uplink LBT procedure on the LBT cell, and (c) $D_{unused}$, where the TA for uplink LBT is greater than or equal to $2T_1$ plus the amount of time needed to perform an uplink LBT procedure and less than or equal to $D_{unused}$.

In some embodiments, the TA for uplink LBT is such that an uplink LBT duration for an uplink LBT procedure performed by the wireless device falls within a time period that starts after reception, at the wireless device, of an end of a last, partial downlink subframe in a downlink burst on the LBT cell.

In some embodiments, the TA for uplink LBT is such that an uplink LBT duration for an uplink LBT procedure performed by the wireless device falls within a time period that (a) starts after reception, at the wireless device, of an end of a last, partial downlink subframe in a downlink burst on the LBT cell, and (b) ends at a time at which a desired uplink transmission by the wireless device is to begin if a result of the uplink LBT procedure is that an uplink channel for the LBT cell is clear. Further, in some embodiments, the time at which the desired uplink transmission by the wireless device is to begin is defined by the separate TA for uplink transmission on the LBT cell.

In some embodiments, the TA for uplink LBT is equal to a one-way propagation delay ($T_1$) between a radio access node providing the LBT cell and the wireless device plus a duration D of a last downlink subframe in a downlink burst on the LBT cell, and the TA for uplink LBT is relative to a downlink reception timing of the wireless device.

In some embodiments, the TA for uplink LBT is such that at least part of an uplink LBT duration for an uplink LBT procedure performed by the wireless device falls within the one-way propagation delay ($T_1$) between the radio access node providing the LBT cell and the wireless device.

In some embodiments, the TA for uplink LBT is such that the at least part of the uplink LBT duration for the uplink LBT procedure performed by the wireless device falls within a time period having a duration that is equal to the one-way propagation delay ($T_1$) between the radio access node providing the LBT cell and the wireless device, the time period starting at a time of transmission of a last downlink subframe in a downlink burst on the LBT cell at the radio access node providing the LBT cell and ending at a time of receipt of the last downlink subframe in the downlink burst on the LBT cell at the wireless device. Further, in some embodiments, the TA for uplink LBT is equal to $D+T_1$, wherein D is a duration of the last downlink subframe in the downlink burst on the LBT cell. Further, in some embodiments, the last downlink subframe in the downlink burst is a last downlink subframe immediately preceding a desired uplink transmission by the wireless device, and the wireless device is not scheduled for data reception in the last downlink subframe. In other embodiments, the last downlink subframe in the downlink burst is a last downlink subframe immediately preceding a desired uplink transmission by the wireless device, the wireless device is scheduled for data reception in the last downlink subframe, and the wireless device does not begin uplink transmission, assuming successful uplink LBT, until reception of the downlink burst at the wireless device is complete.

In some embodiments, sending the indication of the TA for uplink LBT for the LBT cell comprises sending the indication of the TA for uplink LBT for the LBT cell on a first carrier, and the LBT cell is on a second carrier that is different than the first carrier. In some embodiments, the TA for uplink LBT is equal to $D+T_1$, wherein D is a duration of the last downlink subframe in the downlink burst on the LBT cell.

In some embodiments, the TA for uplink LBT is such that an uplink LBT duration for an uplink LBT procedure performed by the wireless device falls within a time period that corresponds to a time gap in a penultimate downlink subframe in a downlink burst on the LBT cell.

Embodiments of a radio access node for a cellular communications network are also disclosed. In some embodiments, the radio access node is adapted to perform the method of operation of a radio access node according to any of the embodiments disclosed herein.

In some embodiments, a radio access for a cellular communications network comprises at least one processor and memory comprising instructions executable by the at least one processor whereby the radio access node is operable to effect transmitting an indication of a TA for uplink LBT for a LBT cell to be used by a wireless device.

In some embodiments, a radio access for a cellular communications network comprises a transmitting module operable to effect transmitting an indication of a TA for uplink LBT for a LBT cell to be used by a wireless device.

Embodiments of a method of operation of a wireless device in a cellular communications network are also disclosed. In some embodiments, a method of operation of a wireless device in a cellular communications network comprises receiving, from a radio access node, an indication of a TA for uplink, LBT for an LBT cell and performing an uplink LBT procedure for the LBT cell according to the TA for uplink LBT.

In some embodiments, the method further comprises receiving, from the radio access node, an indication of a separate TA for uplink transmission on the LBT cell.

In some embodiments, the TA for uplink LBT is such that an uplink LBT duration for the uplink LBT procedure performed by the wireless device falls within a time period that starts after reception, at the wireless device, of an end of a last, partial downlink subframe in a downlink burst on the LBT cell.

In some embodiments, the TA for uplink LBT is such that an uplink LBT duration for the uplink LBT procedure performed by the wireless device falls within a time period that (a) starts after reception, at the wireless device, of an end of a last, partial downlink subframe in a downlink burst on the LBT cell, and (b) ends at a time at which a desired uplink transmission by the wireless device is to begin if a result of the uplink LBT procedure is that an uplink channel for the LBT cell is clear.

In some embodiments, the time at which the desired uplink transmission by the wireless device is to begin is defined by the separate TA for uplink transmission on the LBT cell.

In some embodiments, the TA for uplink LBT is such that at least part of an uplink LBT duration for the uplink LBT procedure performed by the wireless device falls within a one-way propagation delay ($T_1$) between a radio access node providing the LBT cell and the wireless device.

In some embodiments, the TA for uplink LBT is such that at least part of the uplink LBT duration for the uplink LBT procedure performed by the wireless device falls within a time period having a duration that is equal to the one-way propagation delay ($T_1$) between the radio access node providing the LBT cell and the wireless device, the time period starting at a time of transmission of a last downlink subframe in a downlink burst on the LBT cell at the radio access node providing the LBT cell and ending at a time of receipt of the last downlink subframe in the downlink burst on the LBT cell at the wireless device. In some embodiments, the TA for uplink LBT is equal to $D+T_1$, wherein D is a duration of the last downlink subframe in the downlink burst on the LBT cell. In some embodiments, the last downlink subframe in the downlink burst is a last downlink subframe immediately preceding a desired uplink transmission by the wireless device, and the wireless device is not scheduled for data reception in the last downlink subframe. In some other embodiments, the last downlink subframe in the downlink burst is a last downlink subframe immediately preceding a desired uplink transmission by the wireless device, the wireless device is scheduled for data reception in the last downlink subframe, and the wireless device does not begin uplink transmission, assuming successful uplink LBT, until reception of the downlink burst at the wireless device is complete.

In some embodiments, receiving the indication of the TA for uplink LBT for the LBT cell comprises receiving the indication of the TA for uplink LBT for the LBT cell on a first carrier, and the LBT cell is on a second carrier that is different than the first carrier. Further, in some embodiments, the TA for uplink LBT is equal to $D+T_1$, wherein D is a duration of the last downlink subframe in the downlink burst on the LBT cell.

In some embodiments, the TA for uplink LBT is such that an uplink LBT duration for the uplink LBT procedure performed by the wireless device falls within a time period that corresponds to a time gap in a penultimate downlink subframe in a downlink burst on the LBT cell.

Embodiments of a wireless device for operation in a cellular communications network are also disclosed. In some embodiments, a wireless device for operation in a cellular communications network is adapted to operate according to any one of the embodiments of the method of operation of a wireless device disclosed herein.

In some embodiments, a wireless device for operation in a cellular communications network comprises at least one processor and memory comprising instructions executable by the at least one processor whereby the wireless device is operable to receive, from a radio access node, an indication of a TA for uplink LBT for an LBT cell and perform an uplink LBT procedure for the LBT cell according to the TA for uplink LBT.

In some embodiments, a wireless device for operation in a cellular communications network comprises a receiving module and a performing module. The receiving module is operable to receive, from a radio access node, an indication of a TA for uplink LBT for an LBT cell. The performing module is operable to perform an uplink LBT procedure for the LBT cell according to the TA for uplink LBT.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 18A-18C illustrate the process of FIG. 17 in more detail according to some embodiments of the present disclosure;

DETAILED DESCRIPTION

Figure 1:
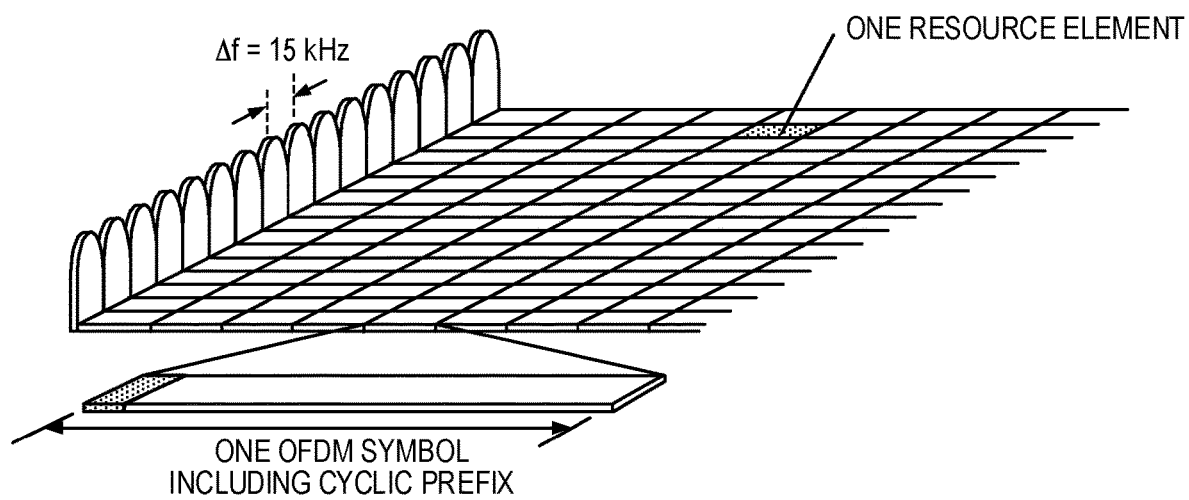
FIG. 1 illustrates a Long Term Evolution (LTE) downlink physical resource as a time-frequency grid.
Figure 2:
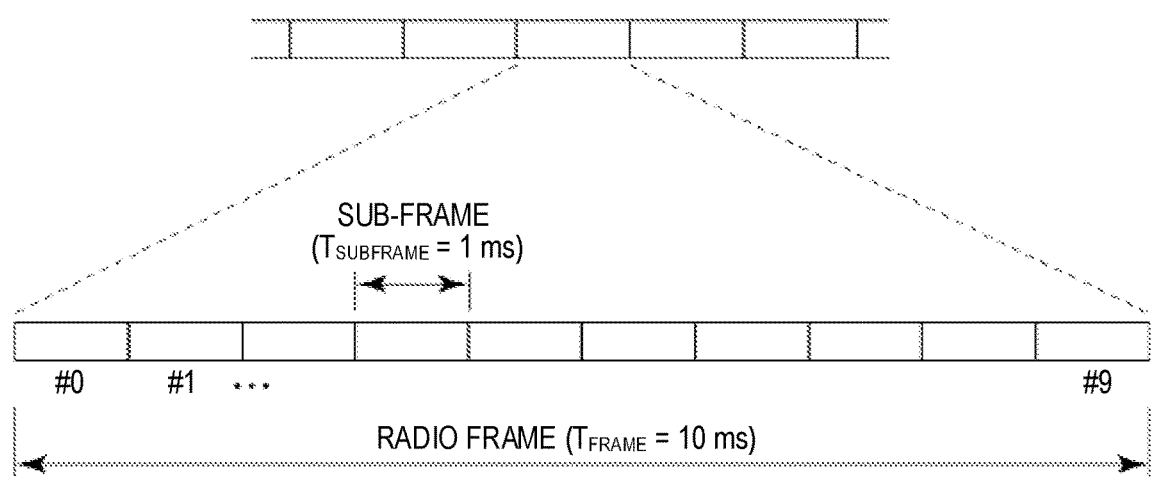
FIG. 2 illustrates the LTE time-domain structure.
Figure 3:
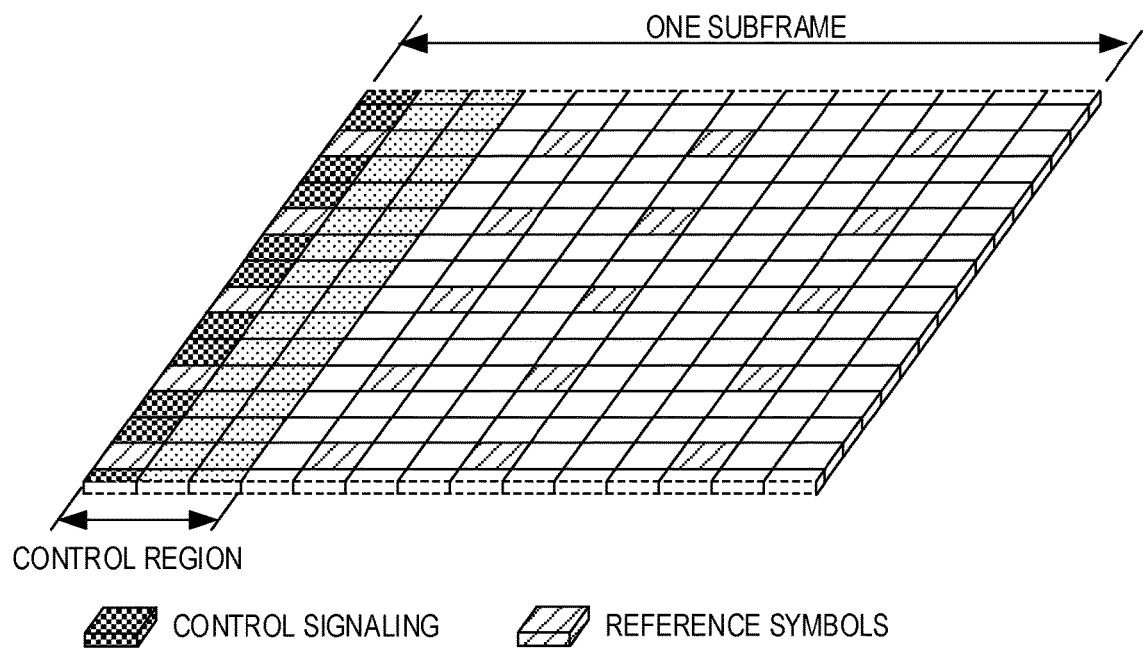
FIG. 3 illustrates a downlink subframe.
Figure 4:
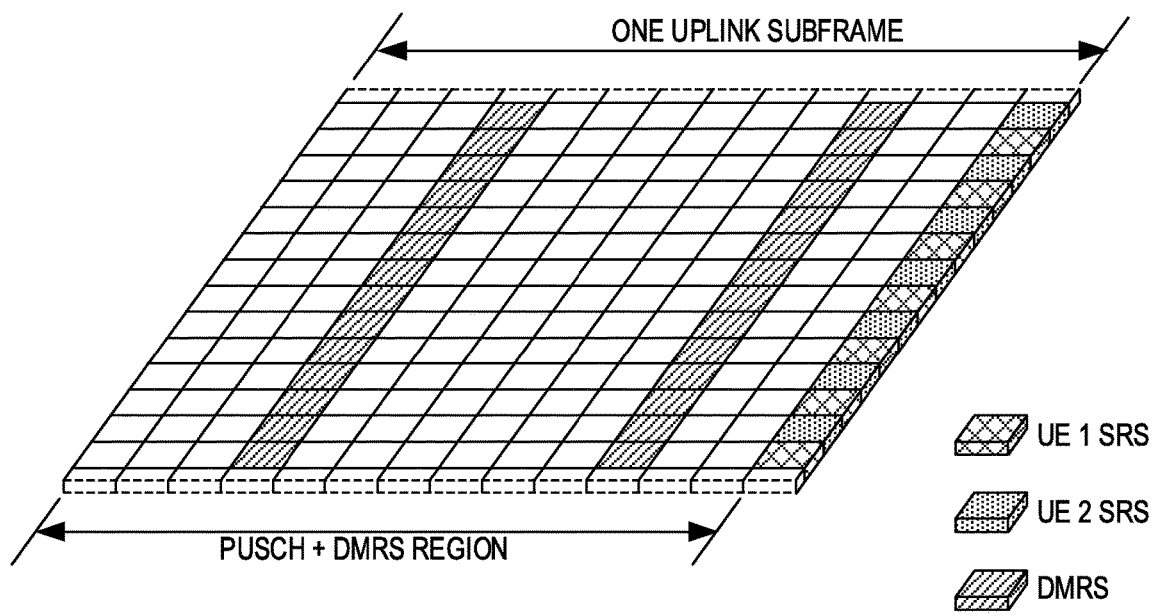
FIG. 4 illustrates a LTE Release (Rel) 12 uplink subframe.
Figure 5:
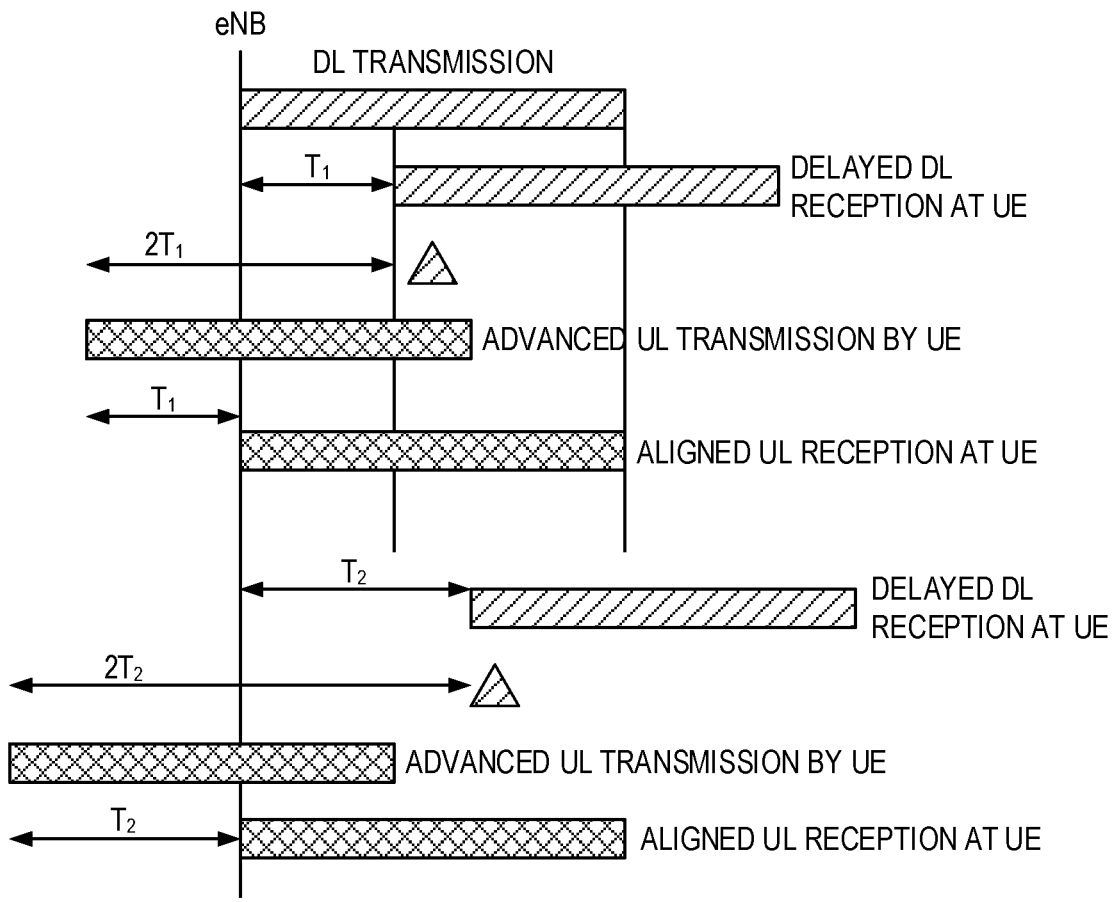
FIG. 5 illustrates uplink Timing Advance (TA) in Frequency Division Duplexing (FDD) LTE.
Figure 6:
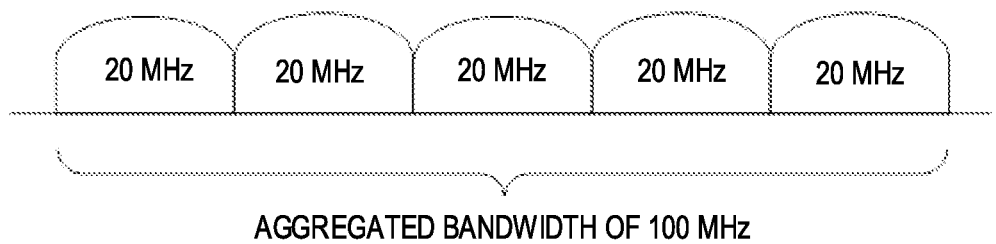
FIG. 6 illustrates Carrier Aggregation (CA)
Figure 7:
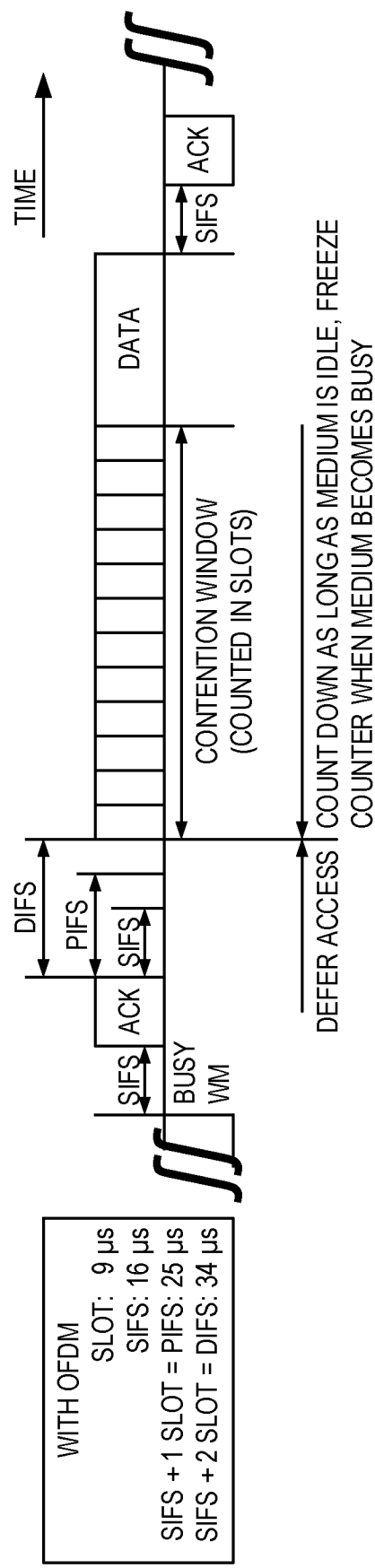
FIG. 7 illustrates Listen-Before-Talk (LBT) in Wi-Fi.
Figure 8:
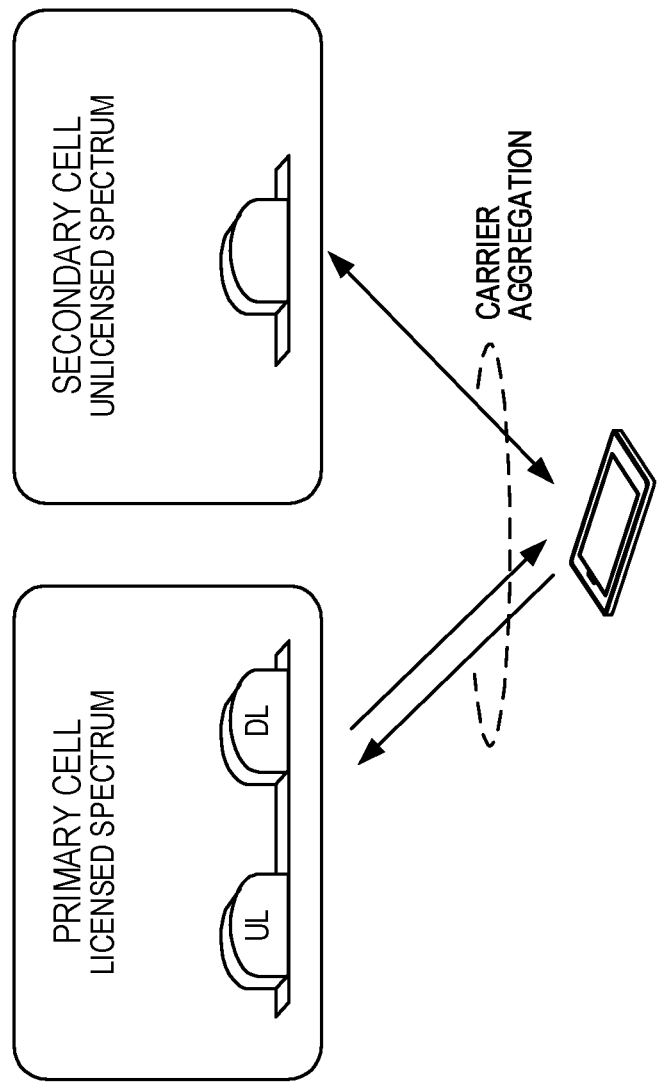
FIG. 8 illustrates License Assisted Access (LAA) to unlicensed spectrum using LTE CA.
Figure 9:
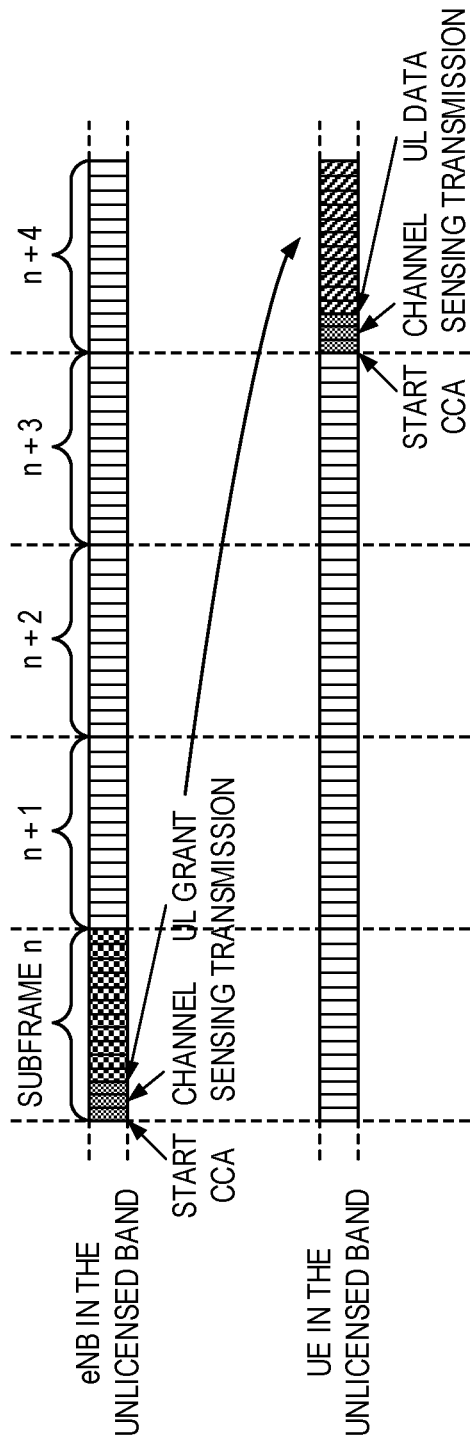
FIG. 9 illustrates uplink LAA LBT.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP LTE network and a Machine Type Communication (MTC) device.

Network Node: As used herein, a "network node" is any node that is either part of the radio access network or the core network of a cellular communications network/system.

Listen-Before-Talk (LBT): As used herein, "LBT" or an "LBT scheme" is any scheme in which a radio access node or wireless device monitors a channel in a frequency spectrum (e.g., an unlicensed frequency spectrum) to determine whether the channel is clear (e.g., performs a Clear Channel Assessment (CCA)) before transmitting on the channel.

LBT Cell: As used herein, an "LBT cell" is a cell that operates on a channel in a frequency spectrum (e.g., an unlicensed frequency spectrum) in which an LBT scheme must be performed before transmitting.

LBT Procedure: As used herein, a "LBT procedure" is any procedure performed by a transmitting node to sense whether a wireless channel is clear for transmission and may optionally also comprise transmitting on the wireless channel if the wireless channel is sensed as clear. A LBT procedure is performed over a period of time, which is referred to herein as a "LBT duration." The LBT duration includes at least a period of time over which a transmitting node senses the wireless channel.

License Assisted Access (LAA) Secondary Cell (SCell): As used herein, an "LAA SCell" is one type of LBT cell. In particular, an "LAA SCell" is an SCell in a LTE network, where the SCell operates in a frequency spectrum that requires LBT (e.g., an unlicensed frequency spectrum), with the assistance from another cell (i.e., Primary Cell (PCell)) operating in a licensed frequency spectrum.

Standalone LBT Cell: As used herein, a "standalone LBT cell" is one type of LBT cell (e.g., a cell in an LTE network) that operates on its own without the assistance from another cell (e.g., another cell operating in a licensed frequency spectrum).

Note that the description given herein focuses on 3GPP LTE and, as such, 3GPP LTE terminology is oftentimes used. However, the concepts disclosed herein are not limited to 3GPP LTE.

Note that, in the description herein, reference is made to the term "cell;" however, particularly with respect to Fifth Generation (5G) concepts, beams may be used instead of cells and, as such, it is important to note that the concepts described herein are equally applicable to both cells and beams. Thus, in some embodiments, the transmissions described herein may be performed on beams rather than cells (e.g., a beam in an unlicensed frequency spectrum).

Uplink Timing Advance (TA) is needed in uplink LAA or MuLTEfire systems, either to provide a gap for LBT by the eNB, or to counteract propagation delays in outdoor deployments. There is currently no solution for uplink TA in 3GPP Release (Rel) 13 LAA or for LBT systems with multiplexed uplink transmissions from multiple users in general. If there is a large gap in time between the end of a downlink transmission burst and the reception of an uplink burst at the eNB, this increases the chances of losing channel access to other LBT nodes of the same or other technologies, such as Wi-Fi.

The present disclosure proposes various embodiments for implementing TA in uplink transmissions on unlicensed carriers with LBT. These solutions minimize the gap between the end of a downlink transmission burst and the reception of an uplink burst at the eNB, which in turn minimizes the chance of losing channel access to other LBT nodes of the same or other technologies.

The following advantages have been identified:
  uplink TA can provide a gap for downlink LBT by the eNB; and
  uplink TA can preserve uplink orthogonality in outdoor unlicensed carrier deployments.

The following embodiments describe how to implement TA in uplink transmissions on unlicensed bands. These approaches hold for both single carrier and multi-carrier scenarios. It is to be understood that the proposed methods also apply to different variations of LTE operating in unlicensed spectrum, such as LAA, LTE in Unlicensed Spectrum (LTE-U), and standalone LTE-U/MuLTEfire.

In a first embodiment, the uplink TA is implemented by the eNB indicating a TA for the start of uplink LBT, along with potentially indicating a separate TA for the uplink transmission itself. The LBT TA is configured such that some or all of the uplink LBT duration falls within the one-way propagation delay $T_1$ between the eNB and a UE.

In other words, the LBT TA is configured such that some or all of the uplink LBT duration falls within a time period equal to the one-way propagation delay $T_1$, where this time period starts at the beginning of transmission, at the eNB, of a downlink subframe and ends at the beginning of reception of the transmission at the UE, which occurs an amount of time $T_1$ later. In this manner, the uplink LBT duration is, at least partially but potentially completely, within a time period in which reception of the downlink subframe at the UE will not interfere with the uplink LBT procedure (e.g., the downlink subframe will not result in the uplink LBT procedure detecting the channel as busy).

Note that, as used herein, the uplink LBT duration is the duration of time over which the uplink LBT procedure is performed. The uplink LBT duration may be, for example, a number of CCA slots, where each CCA slot has, e.g., a predefined duration. For example, for a 10 kilometer (km) eNB-UE separation, three complete CCA slots of 9 microseconds (μs) duration each can fall within the propagation delay of 33.3 μs.

The uplink LBT TA can be configured relative to the downlink reception timing of the UE, using the existing granularity of 0.52 μs, or a coarser granularity using fewer bits. As a non-limiting example, the LBT TA is indicated in the Downlink Control Information (DCI) message that carries the uplink grant and the LBT counter.

Figure 10:
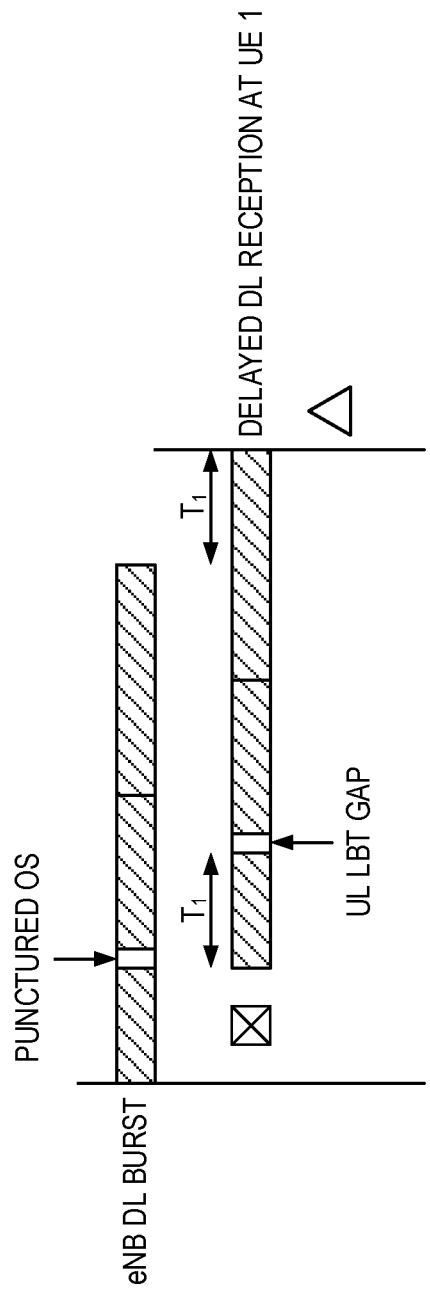
FIG. 10 illustrates downlink subframe puncturing to provide an uplink LBT opportunity prior to the end of the downlink burst.

When a downlink burst contains multiple subframes, a time gap for uplink LBT can be provided by puncturing one or more Orthogonal Frequency Division Multiplexing (OFDM) symbols or a fraction of an OFDM symbol in the penultimate downlink subframe of the burst, as shown in FIG. 10. Note that, as used herein, as it pertains to LBT, a downlink "burst" refers to a number (e.g., one or more) consecutive transmissions by a transmit node. For example, the maximum duration of a transmit burst is typically limited in an unlicensed frequency spectrum in which LBT is required (e.g., for the 5 GHz frequency spectrum, the maximum transmit burst duration is specified by country and region-specific regulations for, e.g., 4 ms in Japan and 13 ms in Europe). So, once a transmit node has performed LBT and found that the channel is clear, the transmit node can begin transmitting and continue to transmit for up to the maximum transmit burst duration. This transmission is referred to as a transmit burst.

The exact TA procedure depends on whether the UE is scheduled for downlink data in the last downlink subframe immediately preceding the uplink transmission. This last downlink subframe is of duration (D), and may be a full subframe with 14 OFDM symbols or a partial subframe with fewer OFDM symbols. The duration (D) is explicitly indicated to the UE in at least the last two downlink subframes of the downlink burst, using either Physical Downlink Control Channel (PDCCH)/enhanced PDCCH (EPDCCH) or L1 signaling.

Figure 11:
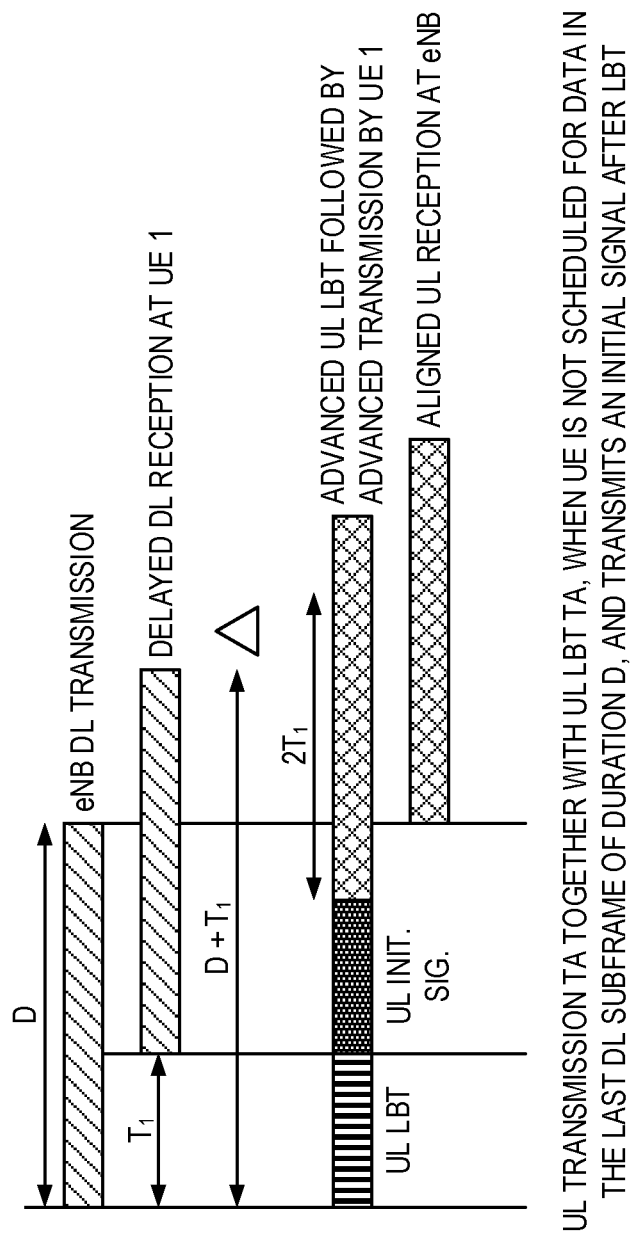
FIG. 11 illustrates an uplink transmission TA together with uplink LBT TA when a User Equipment (UE) is not scheduled for data in the last downlink subframe of a duration (D) and transmits an initial signal after LBT.

An illustration is shown in FIG. 11 for the case where the UE is not scheduled for data reception in the last downlink subframe immediately preceding the uplink transmission. In this context, the uplink transmission may also be referred to as a "desired" uplink transmission since the uplink transmission may or may not be performed depending on the outcome of the LBT procedure. In this example, the UE uses a TA of $(D+T_1)$ to perform uplink LBT. After the uplink LBT is successful, the UE performs an uplink transmission (data, control, or a combination of the two) with a separate TA of $2T_1$. There is a time gap between uplink LBT and uplink transmission during which the UE can transmit an initial signal to occupy the channel.

Figure 12:
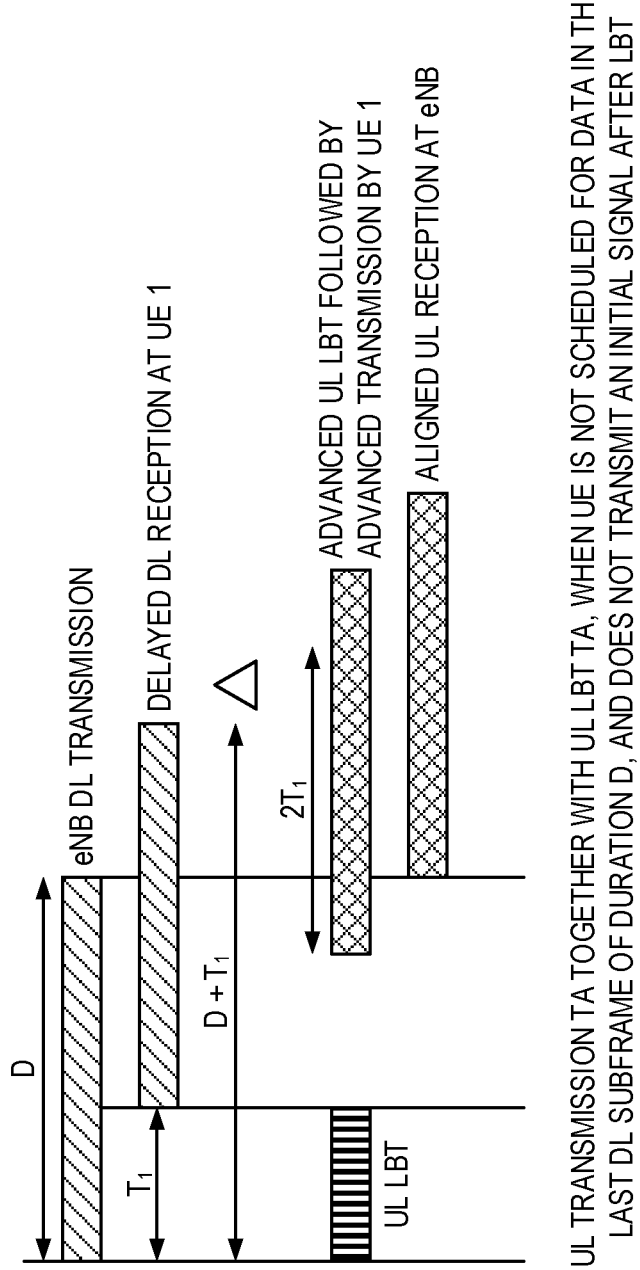
FIG. 12 illustrates an uplink transmission TA together with uplink LBT TA when a UE is not scheduled for data in the last downlink subframe of a duration (D) and does not transmit an initial signal after LBT.

If the UE does not transmit an initial signal as shown in FIG. 12, then nominally this time gap is occupied by downlink energy from the eNB on the unlicensed channel. Additional protection from losing channel access can be obtained by transmission of a Wi-Fi preamble by the UE immediately after completing uplink LBT, where the transmission duration indicated in the preamble covers both the time gap between uplink LBT and transmission, and the duration of the uplink transmission itself. The uplink transmission is then received by the eNB immediately after the conclusion of its downlink transmission.

Figure 13:
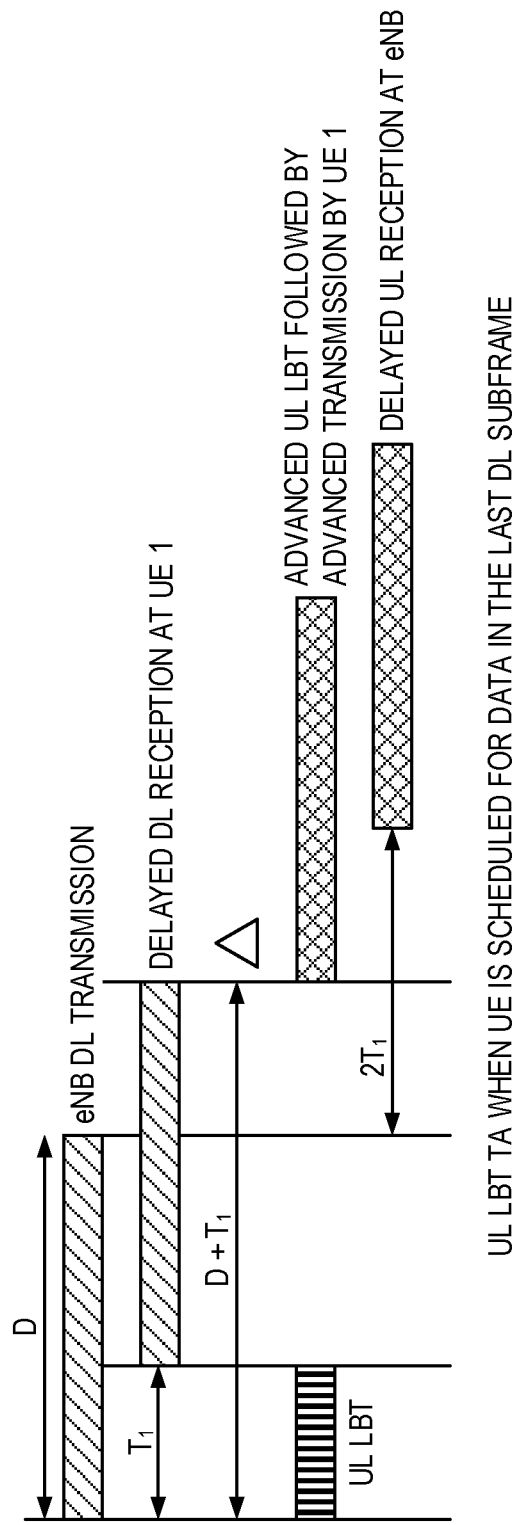
FIG. 13 illustrates an uplink LBT TA when a UE is scheduled for data in the last downlink subframe.

In the case where the UE is scheduled for downlink data reception in the last downlink subframe, the uplink LBT can still be advanced as in the previous example. However, it is generally not feasible to start uplink transmission while simultaneously receiving data in the downlink subframe. This scenario is depicted in FIG. 13.

Furthermore, UEs with advanced Radio Frequency (RF) or interference cancellation capabilities may still be able to receive downlink data in one part of the unlicensed channel while simultaneously transmitting on another frequency allocation on the unlicensed carrier with TA. In this case, the timing sequence would be the same as that in FIG. 10 or FIG. 11.

Figure 14:
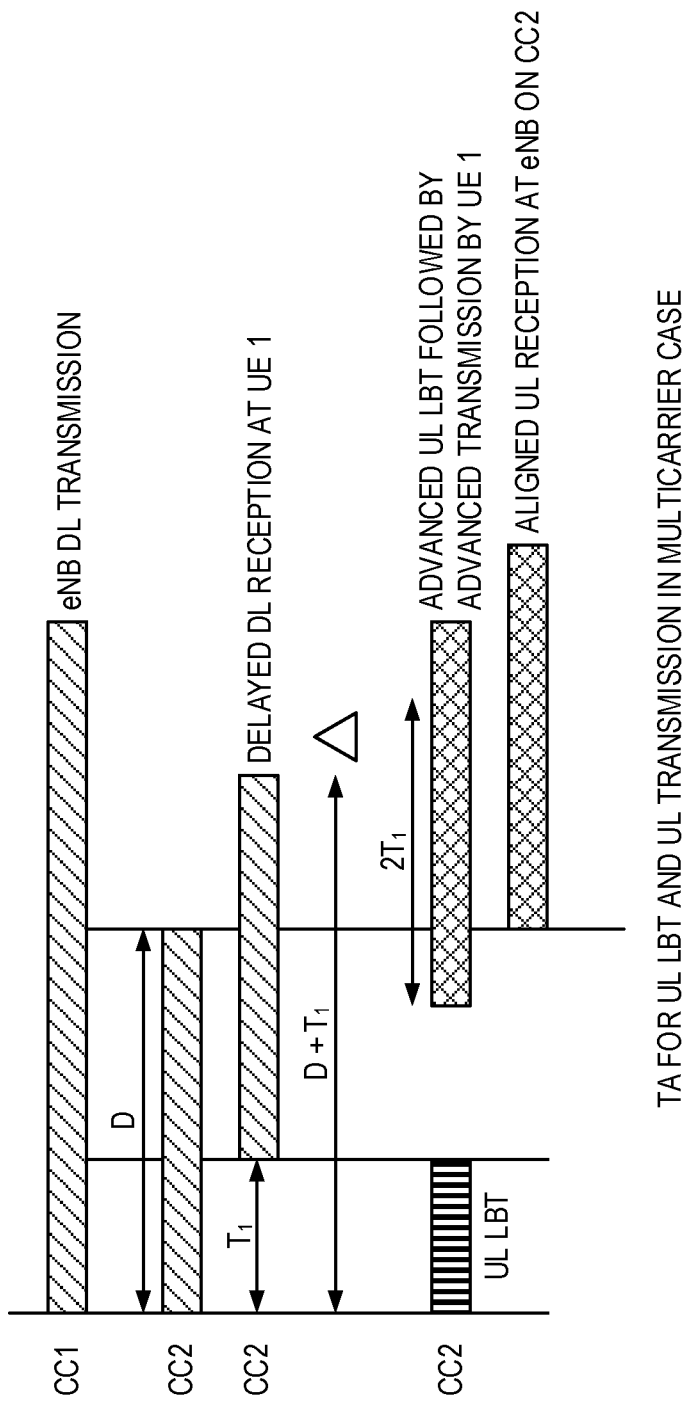
FIG. 14 illustrates TA for uplink LBT and an uplink transmission in a multi-carrier case.

In a second embodiment, a multi-carrier case is considered where the UE receives downlink on one carrier and transmits with TA on another carrier. The LTE-U downlink transmissions of different durations occur on carriers CC1 and CC2, where CC1 may also be used as the primary channel by one or more adjacent Wi-Fi access points. The uplink LBT and uplink transmission with TA occur on CC2. Since the Wi-Fi primary channel is occupied, the gap between uplink LBT and uplink transmission on CC2 cannot be occupied by the multi-channel Wi-Fi access points. An example is shown in FIG. 14. In this example, based on FIG. 14, the Wi-Fi access points follow a channel bonding procedure where the Wi-Fi primary channel, which in this case is CC1, needs to be unoccupied before they can use any of the available channels. Here, the LTE-U eNB is occupying CC1 with a downlink transmission and, as such, the Wi-Fi access points cannot access CC2 even if it is unoccupied.

Figure 15A:
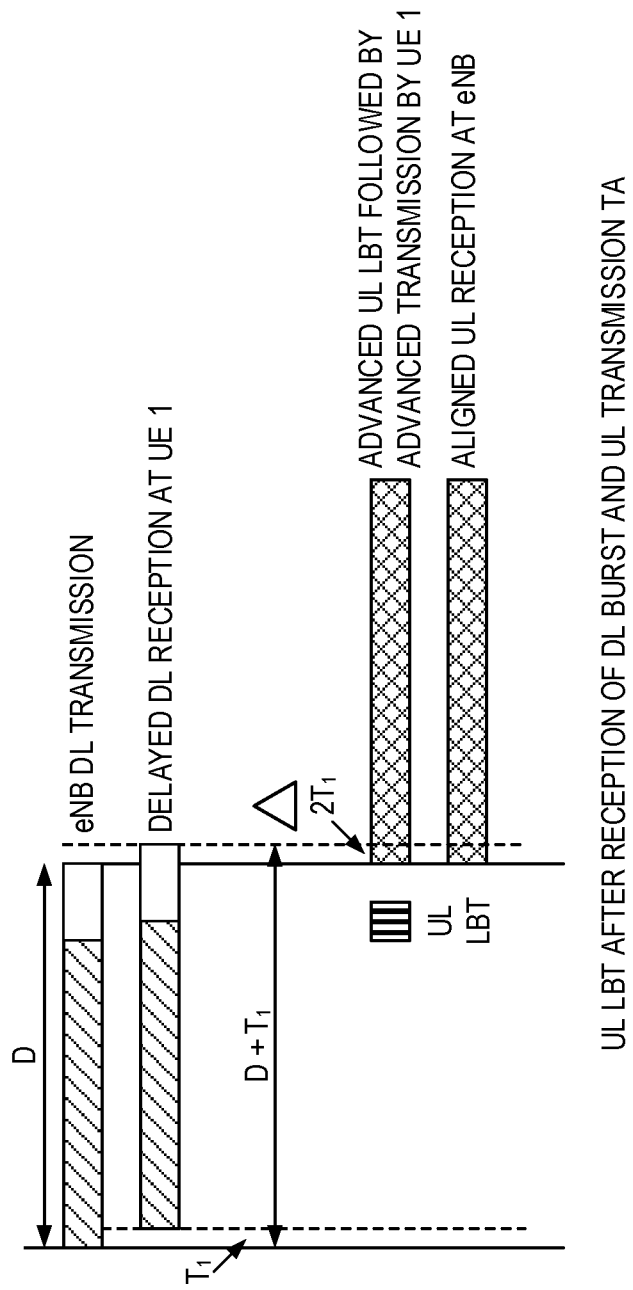
FIGS. 15A and 15B illustrate uplink LBT after reception of a downlink burst and an uplink transmission TA.

In a third embodiment, instead of puncturing the penultimate downlink subframe, the uplink LBT takes place after the last partial subframe is received at the UE, after which a TA is applied to the uplink transmission such that it arrives at a desired point in time relative to the subframe boundary timing at the eNB. An example is shown in FIG. 15A. As illustrated, the last downlink subframe in the downlink burst is a partial downlink subframe (i.e., a downlink subframe in which the downlink transmission does not occupy the full radio subframe). For example, if the radio subframe includes 13 symbol periods, the partial downlink subframe uses only the first N symbol periods, where N<13. The uplink LBT duration occurs at the end of the partial downlink subframe (i.e., in the unused portion of the corresponding radio subframe). In other words, the uplink LBT duration falls within a time period that starts at a time of reception of the end of the partial downlink subframe at the UE. In the example of FIG. 15A, this time period ends at a time at which a desired uplink transmission by the UE is to start, at the UE, if the LBT procedure is successful (i.e., if the result of the LBT procedure is that the uplink channel is clear). In the example of FIG. 15A, the time at which the desired uplink transmission by the UE is to start is defined by the TA for uplink transmission, which is $2T_1$ in the illustrated example.

Figure 15B:
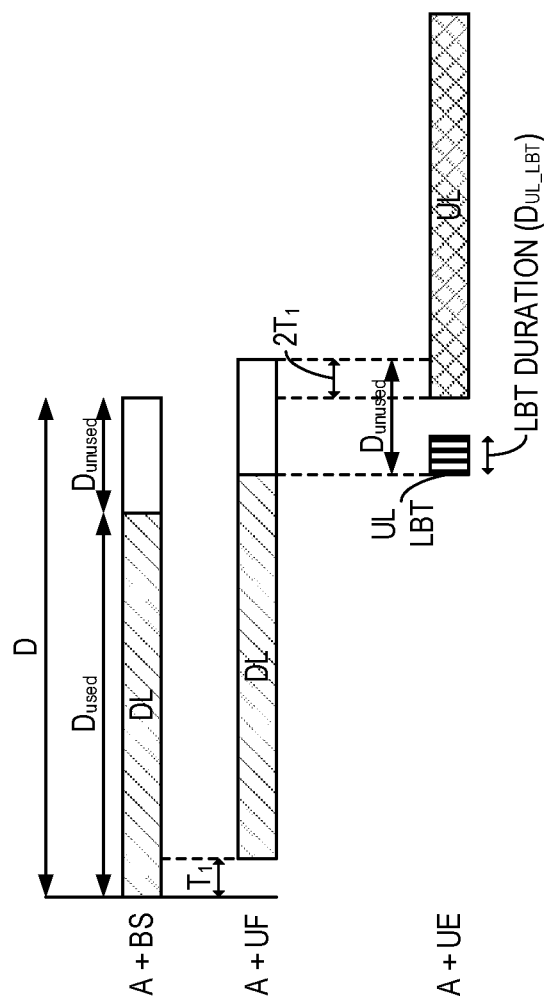

FIG. 15B illustrates the example of FIG. 15A but further illustrates the possible range of values for the TA for uplink LBT in accordance with the example of FIG. 15A. As illustrated in FIG. 15B and as would be understood from FIG. 15A, the full downlink subframe has a duration D. A used portion of the downlink subframe has a duration $D_{used}$, and an unused portion of the downlink subframe has a duration $D_{unused}$. The used portion of the downlink subframe is the partial downlink subframe. As can be seen from this illustration, in order for the uplink LBT duration to fall within the unused portion of the downlink subframe as received at the UE, the TA for uplink LBT needs to be greater than or equal to $D_{unused}$ and less than or equal to $2T_1$ plus the uplink LBT duration ($D_{UL\_LBT}$). Again, the TA for uplink LBT is relative to the downlink timing of the UE. In other words, the TA for uplink LBT is relative to time of reception of the downlink subframe at the UE. Thus, the TA for uplink LBT can be seen as a negative offset with respect to the downlink subframe boundary at the UE.

Figure 16A:
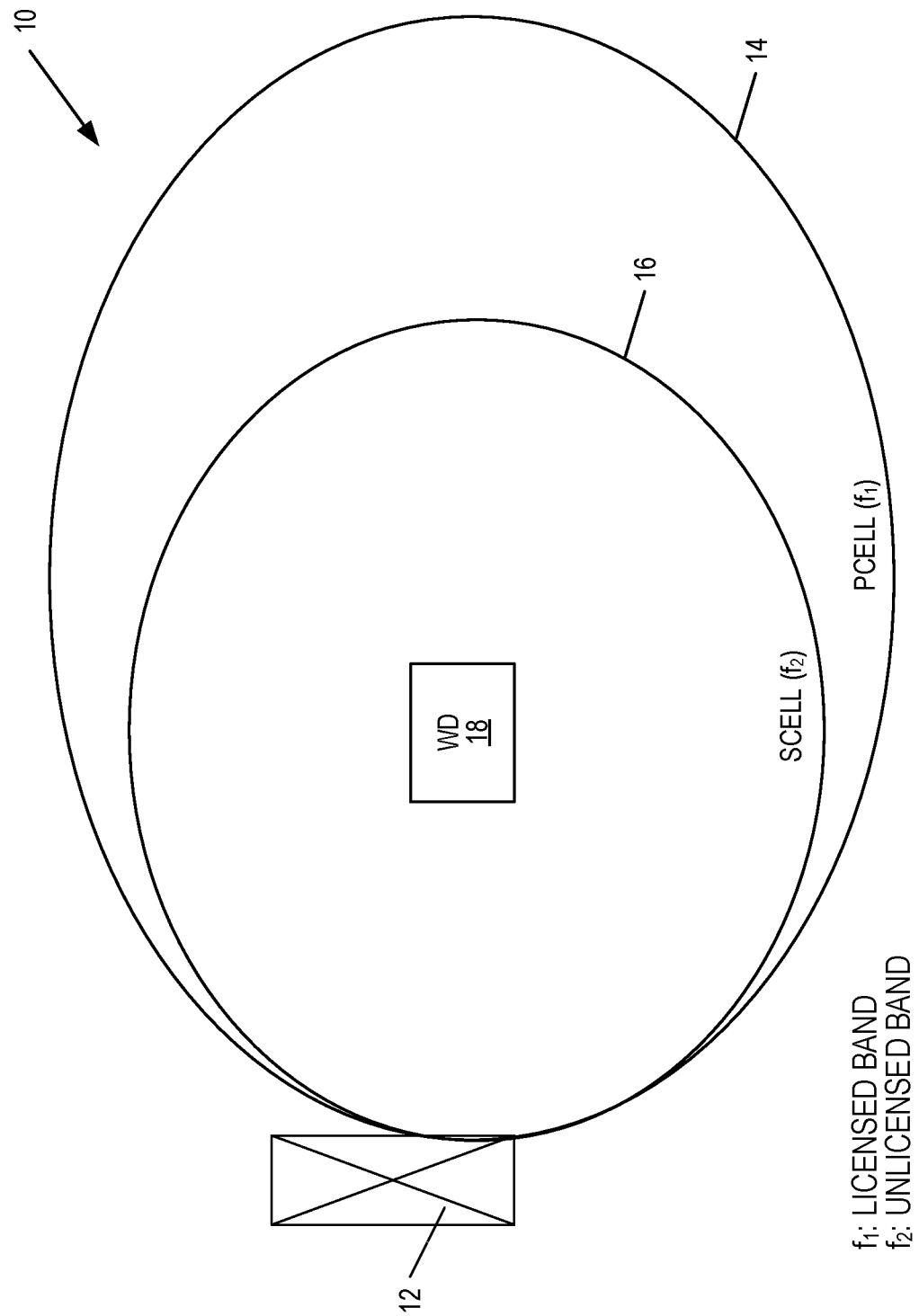
FIGS. 16A-16C illustrate cellular communications networks according to some embodiments of the present disclosure.
Figure 16B:
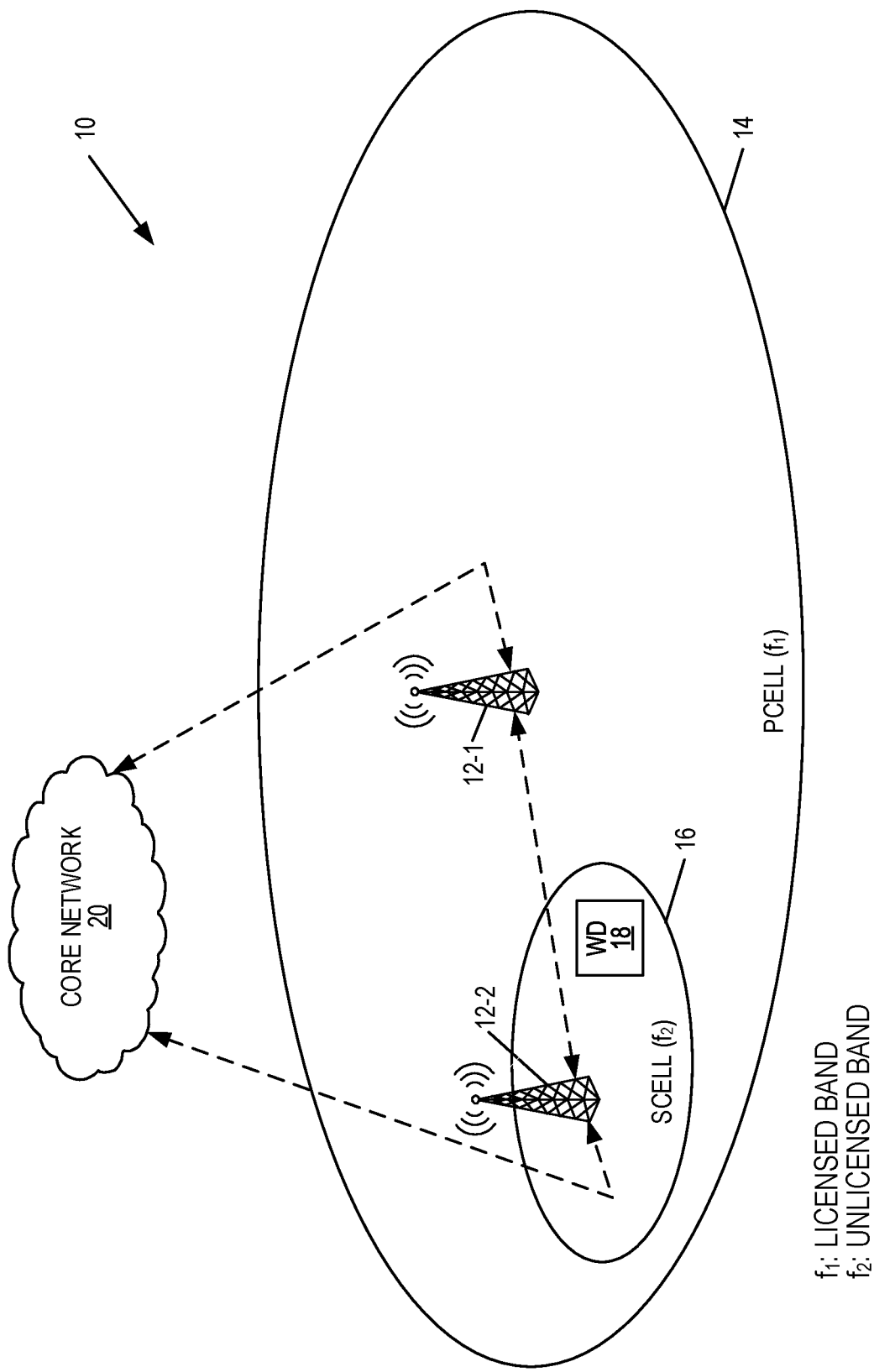
Figure 16C:
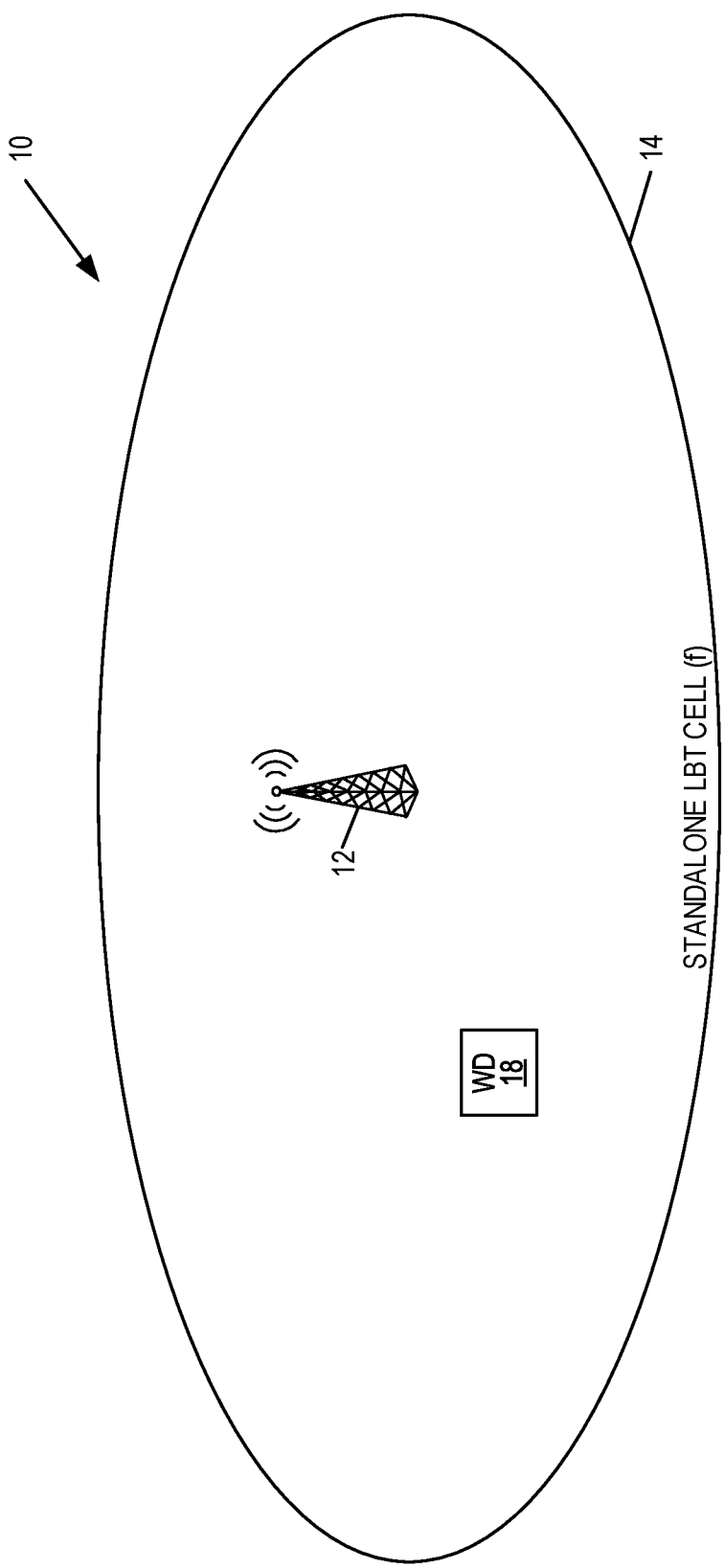

Embodiments of the present disclosure are implemented in a cellular communications network 10 (also referred to herein as a communications system), examples of which are illustrated in FIGS. 16A-16C. In the example of FIG. 16A, the cellular communications network 10 includes a base station 12 (e.g., an eNB in LTE terminology) serving a cell 14 operating on a carrier $f_1$ in a licensed frequency spectrum and a cell 16 operating on a carrier $f_2$ in an unlicensed frequency spectrum (e.g., the 5 gigahertz (GHz) frequency spectrum). According to a one example LAA scheme, the cell 14 is configured as a PCell of a wireless device 18 (e.g., an LTE UE), and the cell 16 is configured as a SCell of the wireless device 18, according to a Carrier Aggregation (CA) scheme for LAA. As such, with respect to the wireless device 18, the cell 14 is referred to as the PCell 14 of the wireless device 18, and the cell 16 is referred to as the SCell 16 or, more precisely, the LAA SCell 16 of the wireless device 18.

In FIG. 16B, the cells 14 and 16 are served by separate base stations 12-1 and 12-2, respectively. In this regard, the cell 16 may be, e.g., an LAA cell utilized with respect to the wireless device 18 according to a dual connectivity scheme (where the base stations 12-1 and 12-2 are connected via a non-ideal backhaul link). The base stations 12-1 and 12-2 are communicatively connected to a core network 20 (e.g., an Evolved Packet Core (EPC)) and, in some embodiments, may communicate with one another either via a base-station-to-base-station interface (e.g., the X2 interface in LTE) or via the core network 20.

FIG. 16C illustrates an example in which the cell 14 served by the base station 12 is a standalone LBT cell.

Figure 17:
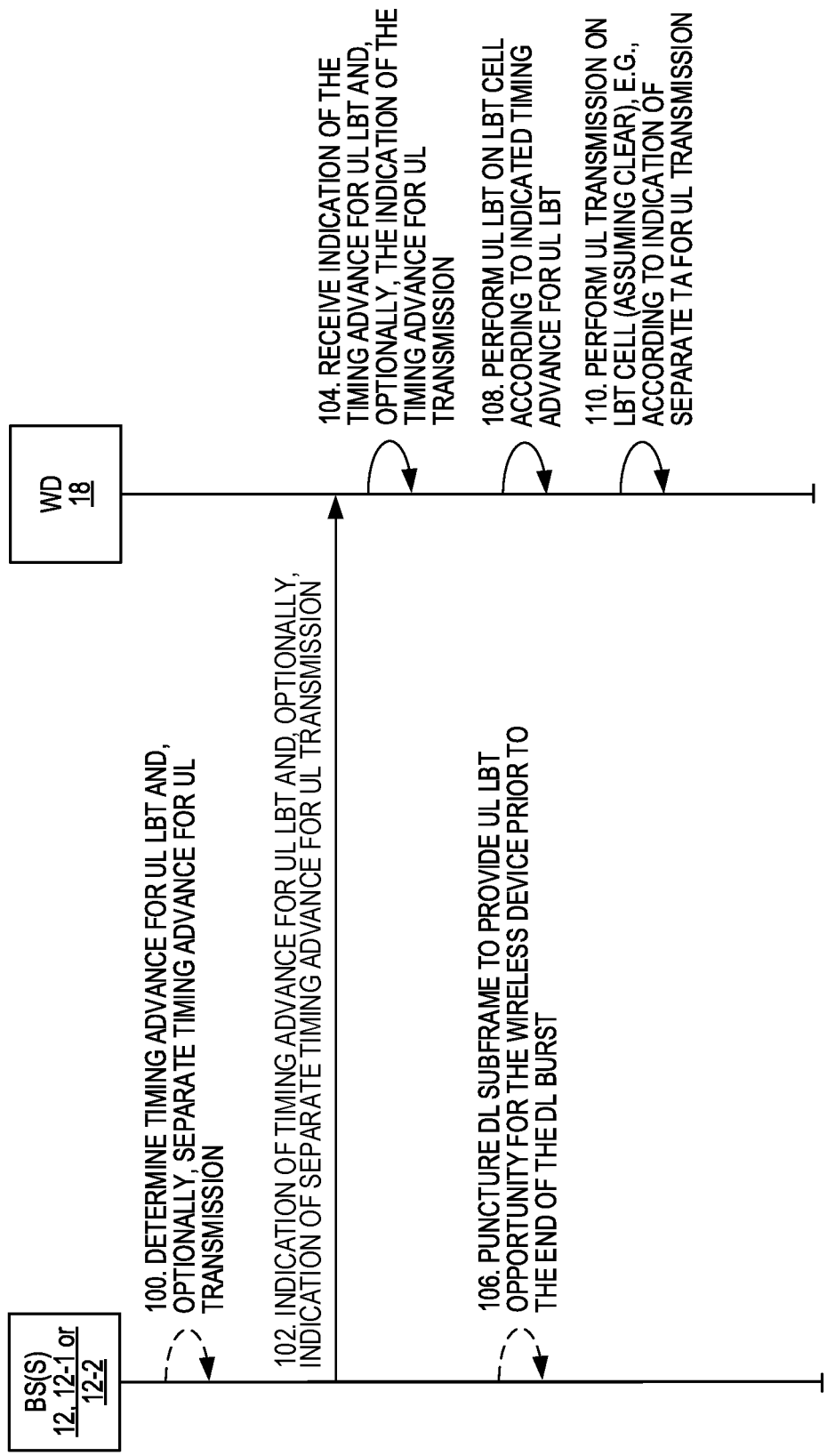
FIG. 17 illustrates the operation of the base station and the wireless device of the cellular communications network according to some embodiments of the present disclosure.

FIG. 17 illustrates the operation of the base station 12 (or the base 12-1 or the base station 12-2) and the wireless device 18 according to some embodiments of the present disclosure. As illustrated, the base station 12 (or more generally a radio access node) determines, or otherwise obtains, a TA for uplink LBT and, optionally (depending on the embodiment), a TA for uplink transmission for the wireless device 18 (UE) (step 100). In some embodiments, the base station 12 obtains a one-way propagation delay ($T_1$) between the base station 12 (or the base station 12-1 or 12-2) providing the LBT cell and the wireless device 18 and determines the TA for uplink LBT based on $T_1$. In one example embodiment, the base station 12 determines the TA for uplink LBT based on $T_1$ such that the TA for uplink LBT is greater than $2T_1$ (see, e.g., FIGS. 11 through 15B). In another example embodiment, the base station 12 determines the TA for uplink LBT based on $T_1$ and an amount of time needed to perform uplink LBT on the LBT cell (e.g., the uplink LBT duration) such that the TA for uplink LBT is greater than or equal to $2T_1$ plus the amount of time needed to perform uplink LBT on the LBT cell (see, e.g., FIGS. 11 through 15B). The amount of time needed to perform uplink LBT may be predefined (e.g., by standard) or otherwise known to the base station 12. In yet another example embodiment, a last downlink subframe in a downlink burst on the LBT cell includes a used portion of duration $D_{used}$ corresponding to a partial downlink subframe and an unused portion of duration $D_{unused}$, and the base station 12 determines the TA for uplink LBT based on $T_1$, an amount of time needed to perform uplink LBT on the LBT cell (e.g., the uplink LBT duration), and $D_{unused}$ such that the TA for uplink LBT is greater than or equal to $2T_1$ plus the amount of time needed to perform an uplink LBT procedure and less than or equal to $D_{unused}$. In yet another example, the base station 12 determines the TA for uplink LBT based on a known gap in a penultimate downlink subframe in a downlink burst on the LBT cell such that, at the wireless device 18, the uplink LBT duration falls within the gap.

The base station 12 (or the base station 12-1 or 12-2) sends, to the wireless device 18 (e.g., a UE), an indication of the TA for uplink LBT and, optionally (depending on the embodiment), an indication of the separate TA for uplink transmission (step 102). Thus, the base station 12 transmits an indication of the TA for uplink LBT to be used by the wireless device 18. Notably, since the separate TA for uplink transmission is optional, in some embodiments, the base station 12 sends only the TA for uplink LBT. Thus, in this case, the TA for uplink LBT is, more specifically, a TA for both uplink LBT and uplink transmission on the LBT cell. In other words, the TA for uplink LBT is a TA that indicates when the LBT procedure is to be started followed by the uplink transmission if the LBT procedure determines that the channel is clear.

As discussed above, the TA for uplink LBT is configured such that at least part of the uplink LBT duration for the LBT procedure performed by the wireless device 18 falls within either:

(a) a time period of duration $T_1$ (i.e., the one-way propagation delay between the base station 12 (or 12-2) serving/providing the LBT cell and the wireless device 18) starting at the beginning of the last downlink subframe in a downlink burst on the LBT cell by the respective base station 12 or 12-2 (see, for example, FIGS. 11-14), or (b) a time period starting after reception, at the wireless device 18, of the end of a last, partial downlink subframe in a downlink burst on the LBT cell (see, for example, FIG. 15A or 15B), or (c) a gap in a (penultimate) downlink subframe in a downlink burst on the LBT cell (see, for example, FIG. 10).

Note that, in some embodiments, the base station 12 that transmits the indication of the TA for uplink LBT may not be the same as the base station 12 serving/providing the LBT cell. For example, the indication of the TA for the uplink LBT cell may be transmitted by the base station 12-1, and the LBT cell may be served by the base station 12-2. However, in other embodiments, the base station 12 that transmits the indication of the TA for uplink LBT is the same as the base station 12 serving/providing the LBT cell. For example, in some embodiments, the base station 12 transmits the indication for the TA for uplink LBT on the PCell 14 of the wireless device 18, and the uplink LBT procedure is performed by the wireless device 18 with respect to the LAA SCell 16. As another example, in some embodiments, the base station 12 transmits the indication for the TA for uplink LBT on the LAA SCell 16 of the wireless device 18, and the uplink LBT procedure is performed by the wireless device 18 with respect to the same (or possibly a different) LAA SCell 16.

The wireless device 18 receives the indication of the TA for uplink LBT and, optionally, the indication of the separate TA for uplink transmission (step 104) and performs uplink LBT for an upcoming uplink transmission in accordance with the indicated TA for uplink LBT (step 108). Notably, in some embodiments, the base station 12 (or base station 12-2) serving the LBT cell may puncture a downlink subframe to provide an opportunity for the wireless device 18 to perform the uplink LBT prior to the end of a corresponding downlink burst, as described above (step 106). Step 106 is optional, depending on the particular embodiment. Assuming that the uplink LBT is successful (i.e., the channel is clear), the wireless device 18 performs the uplink transmission, potentially in accordance with the separate TA for uplink transmission (step 110).

Figure 18A:
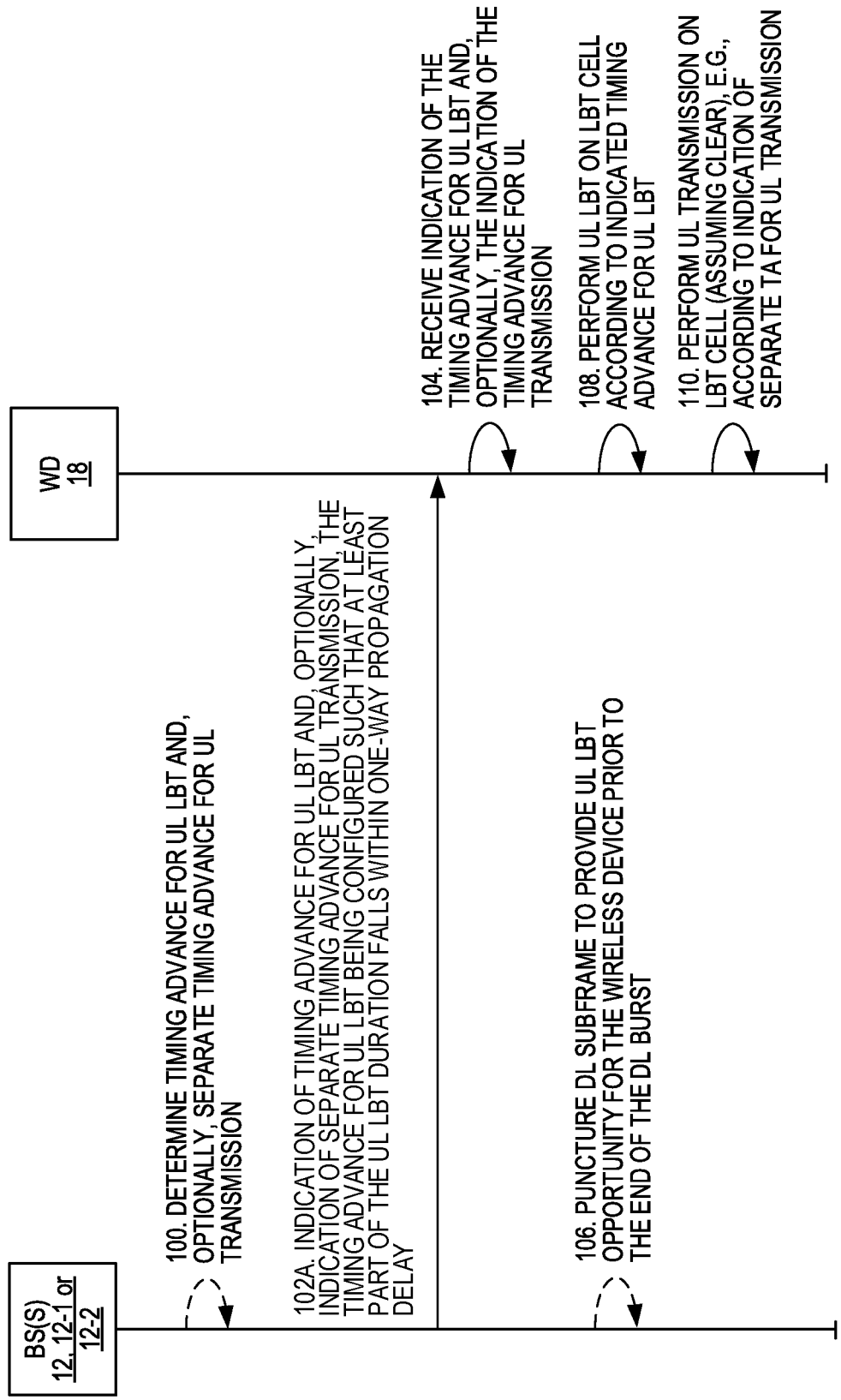
Figure 18B:
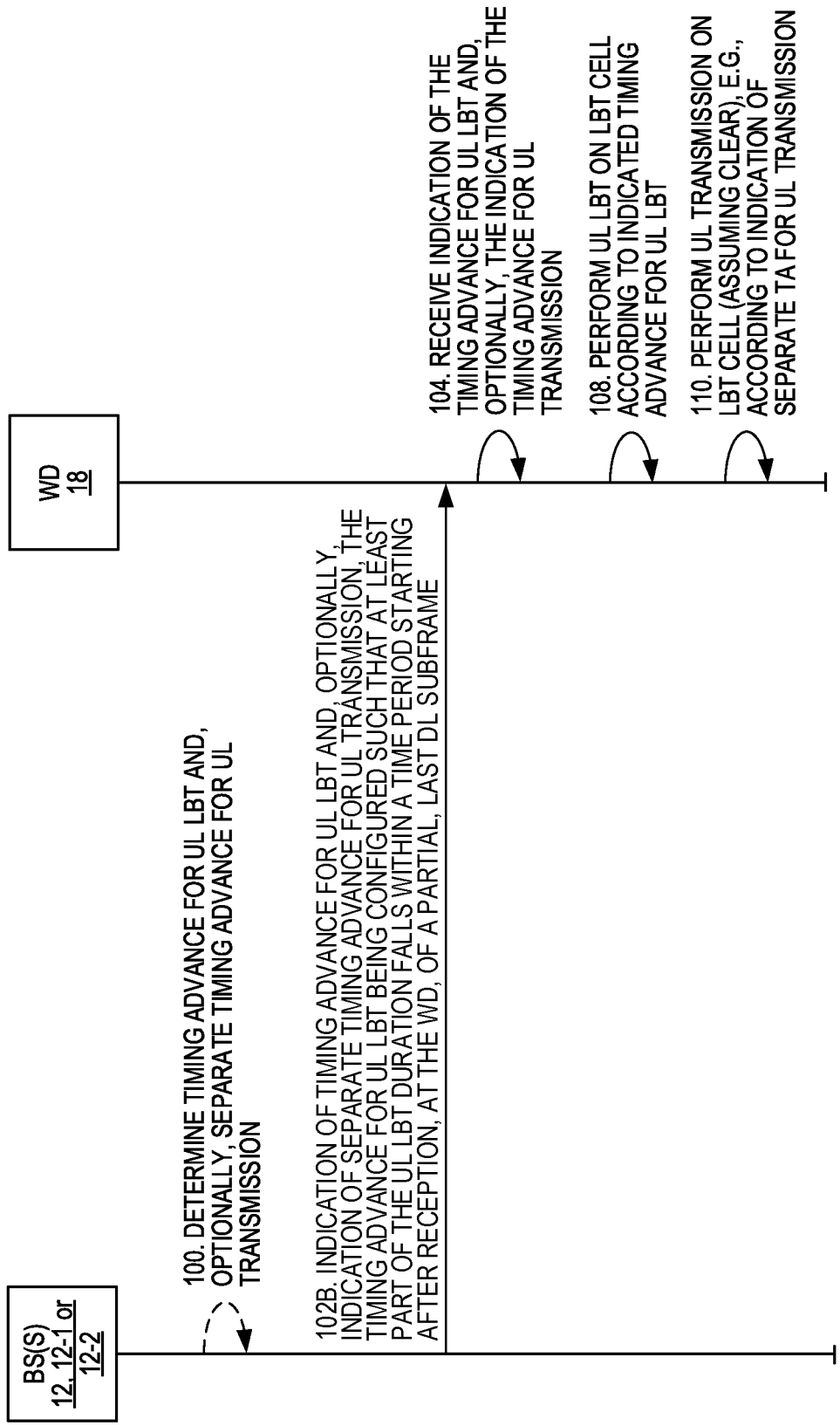

FIGS. 18A through 18C illustrate the process of FIG. 17 in more detail according to some embodiments of the present disclosure. In particular, FIG. 18A illustrates the process of FIG. 17 in more detail in accordance to embodiments in which the TA for uplink LBT is configured such that at least part of the uplink LBT duration for the LBT procedure performed by the wireless device 18 falls within a time period of duration $T_1$ (i.e., the one-way propagation delay between the base station 12 (or 12-2) serving/providing the LBT cell and the wireless device 18) starting at the beginning of the last downlink subframe in a downlink burst on the LBT cell by the respective base station 12 or 12-2, as described above.

As illustrated in FIG. 18A, in this embodiment, the base station 12 (or more generally a radio access node) determines a TA for uplink LBT and, optionally (depending on the embodiment), a TA for uplink transmission for the wireless device 18 (step 100). In this example, the base station 12 determines the TA for uplink LBT based on $T_1$ and, optionally, an amount of time needed to perform uplink LBT at the wireless device 18 (e.g., the uplink LBT duration), as described above. The base station 12 (or base station 12-1 or 12-2) sends, to the wireless device 18 (e.g., a UE), an indication of the TA for uplink LBT and, optionally (depending on the embodiment), an indication of the separate TA for uplink transmission (step 102A). Thus, the base station 12 transmits an indication of the TA for uplink LBT to be used by the wireless device 18. In this embodiment, the TA for uplink LBT is such that the uplink LBT procedure falls within a time period of duration $T_1$ (i.e., the one-way propagation delay between the base station 12 (or 12-2) serving/providing the LBT cell and the wireless device 18) starting at the beginning of the last downlink subframe in a downlink burst on the LBT cell by the respective base station 12 or 12-2, as described above. From this point, the procedure proceeds as described above with respect to FIG. 17. As such, the details are not repeated.

FIG. 18B illustrates the process of FIG. 17 in more detail in accordance to embodiments in which the TA for uplink LBT is configured such at least part of (or all of) the uplink LBT duration for the LBT procedure performed by the wireless device 18 falls within a time period starting after reception, at the wireless device 18, of the end of a last, partial downlink subframe in a downlink burst on the LBT cell, as described above. As illustrated, in this embodiment, the base station 12 (or more generally a radio access node) determines a TA for uplink LBT and, optionally (depending on the embodiment), a TA for uplink transmission for the wireless device 18 (step 100). In this example, the base station 12 determines the TA for uplink LBT based on $T_1$ and knowledge regarding a last, partial subframe in a downlink burst on the LBT cell, as described above. More specifically, in one example, the base station 12 determines the TA for uplink LBT based on $T_1$, an amount of time needed to perform uplink LBT on the LBT cell (e.g., the uplink LBT duration), and $D_{unused}$ such that the TA for uplink LBT is greater than or equal to $2T_1$ plus the amount of time needed to perform an uplink LBT procedure and less than or equal to $D_{unused}$. The base station 12 (or more generally a radio access node) sends, to the wireless device 18 (e.g., a UE), an indication of the TA for uplink LBT and, optionally (depending on the embodiment), an indication of the separate TA for uplink transmission (step 102B). Thus, the base station 12 transmits an indication of the TA for uplink LBT to be used by the wireless device 18. In this embodiment, the TA for uplink LBT is configured such at least part of (or all of) the uplink LBT duration for the LBT procedure performed by the wireless device 18 falls within a time period starting after reception, at the wireless device 18, of the end of a last, partial downlink subframe in a downlink burst on the LBT cell, as described above. From this point, the procedure proceeds as described above with respect to FIG. 17. As such, the details are not repeated. Note, however, that puncturing (step 106) is not performed in this example.

FIG. 18C illustrates the process of FIG. 17 in more detail in accordance to embodiments in which the TA for uplink LBT is configured such that at least part of (or all of) the uplink LBT duration for the LBT procedure performed by the wireless device 18 falls within a gap in the downlink burst (e.g., in the penultimate downlink subframe in the downlink burst), as described above. As illustrated, in this embodiment, the base station 12 (or more generally a radio access node) determines a TA for uplink LBT and, optionally (depending on the embodiment), a TA for uplink transmission for the wireless device 18 (step 100). In this example, the base station 12 determines the TA for uplink LBT based on $T_1$ and knowledge regarding a gap in a penultimate downlink subframe in a downlink burst on the LBT cell such that, at the wireless device 18, the uplink LBT procedure is performed during the gap, as described above. The base station 12 (or more generally a radio access node) sends, to the wireless device 18 (e.g., a UE), an indication of the TA for uplink LBT and, optionally (depending on the embodiment), an indication of the separate TA for uplink transmission (step 102C). Thus, the base station 12 transmits an indication of the TA for uplink LBT to be used by the wireless device 18. In this embodiment, the TA for uplink LBT is configured such at least part of (or all of) the uplink LBT duration for the LBT procedure performed by the wireless device 18 falls within a gap in the downlink burst (e.g., in the penultimate downlink subframe in the downlink burst), as described above. From this point, the procedure proceeds as described above with respect to FIG. 17. As such, the details are not repeated. Note, however, that puncturing (step 106) is performed in this example.

Figure 19:
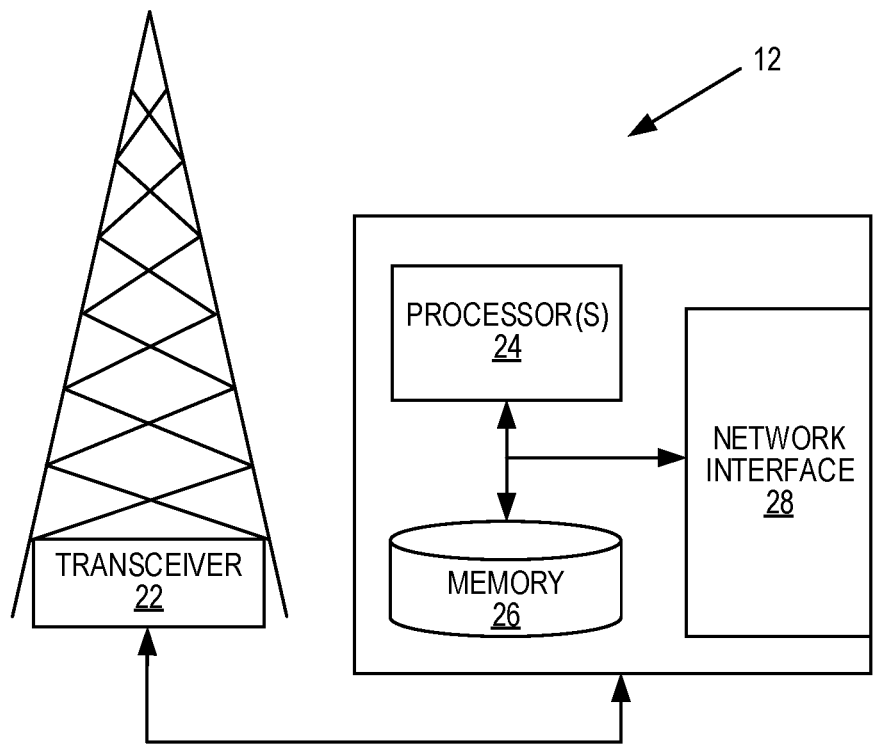
FIGS. 19 and 20 illustrate embodiments of a base station according to some embodiments of the present disclosure.

FIG. 19 is schematic diagram of the base station 12 in accordance with some embodiments of the present disclosure. Note that this discussion is equally applicable to the base stations 12-1 and 12-2. The base station 12 can be an LTE base station (e.g., an eNB or a PCell base station) or another type of base station that can communicate wirelessly with the wireless device 18 (which, in LTE, may be a UE) (e.g., an SCell radio station operating in unlicensed spectrum or a base station for a standalone LBT cell). The base station 12 includes a transceiver 22, one or more processors 24 (e.g., one or more Central Processing Units (CPUs), one or more Application Specific Integrated Circuits (ASICs), one or more Field Programmable Gate Arrays (FPGAs), and/or the like), memory 26, and a network interface 28. The transceiver 22, which may include one or more transmitters and one or more receivers, allows the base station 12 to send and receive wireless signals. The processor(s) 24 can execute instructions stored in the memory 26 based on, e.g., signals received wirelessly via the transceiver 22. In particular, in some embodiments, the functionality of the base station 12 described herein is implemented in software that is stored in the memory 26 and executed by the processor(s) 24. The network interface 28 allows the base station 12 to interact with a core network, such as sending and receiving signals from a wired link. The base station 12 can communicate wirelessly with one or more wireless devices 18.

In some embodiments, a computer program including instructions which, when executed by at least one processor, causes the at least one processor to carry out the functionality of the base station 12 (or the base station 12-1 or 12-2) according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 26).

Figure 20:
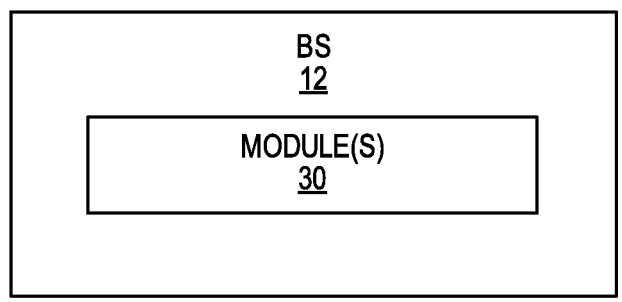

FIG. 20 illustrates the base station 12 according to some other embodiments of the present disclosure. Note that this discussion is equally applicable to the base stations 12-1 and 12-2. The base station 12 includes one or more modules 30, each of which is implemented in software. The module(s) 30 operate to provide the functionality of the base station 12 according to any of the embodiments described herein. For example, the module(s) 30 include, in some embodiments, a TA indication module that is operable to send (e.g., via an associated transceiver of the base station 12, not shown) an indication of the TA for uplink LBT to the wireless device 18, as described above. In addition, in some embodiments, the TA indication module is further operable to send an indication of a separate TA for uplink transmission to the wireless device 18, as described above. In some embodiments, the module(s) 30 also include a puncturing module that is operable to puncture a downlink subframe to provide an uplink LBT opportunity for the wireless device 18 according to the TA for uplink LBT.

Figure 21:
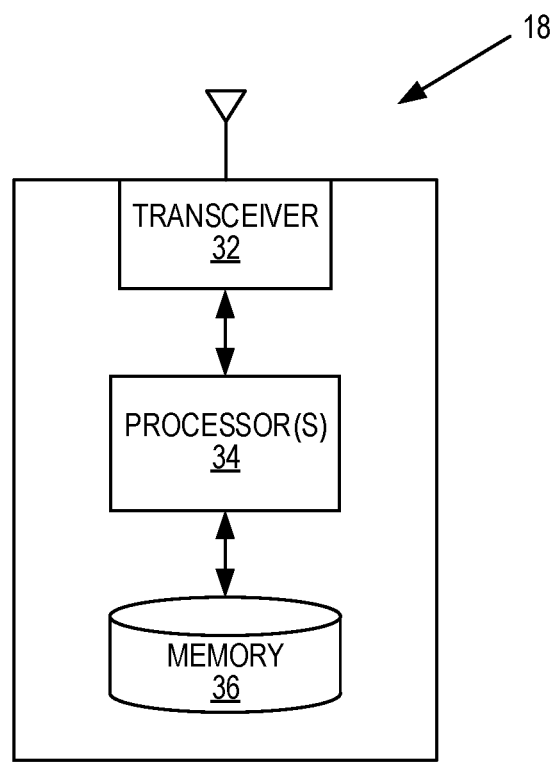
FIGS. 21 and 22 illustrate embodiments of a wireless device according to some embodiments of the present disclosure.

FIG. 21 is a schematic diagram of the wireless device 18 in accordance with some embodiments of the present disclosure. The wireless device 18 is configured to send and receive wireless signals using resources from the licensed spectrum (e.g., the licensed LTE spectrum in the example embodiments described herein), the unlicensed spectrum, or both. The wireless device 18 includes a transceiver 32 including one or more transmitters and one or more receivers, one or more processors 34 (e.g., one or more CPUs, one or more ASICs, one or more FPGAs, and/or the like), and memory 36. The transceiver 32 allows the wireless device 18 to send and receive wireless signals. The processor(s) 34 can execute instructions stored in the memory 36 based on, e.g., signals received wirelessly via the transceiver 32. In particular, in some embodiments, the functionality of the wireless device 18 described herein is implemented in software that is stored in the memory 36 and executed by the processor(s) 34.

In some embodiments, a computer program including instructions which, when executed by at least one processor, causes the at least one processor to carry out the functionality of the wireless device 18 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 36).

Figure 22:
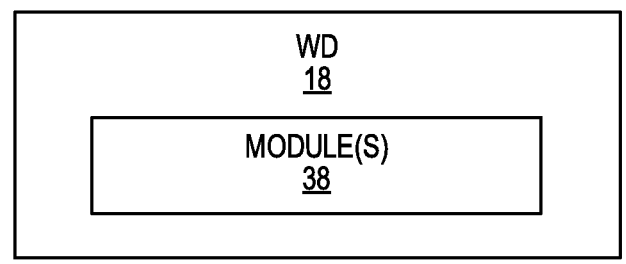

FIG. 22 illustrates the wireless device 18 according to some other embodiments of the present disclosure. The wireless device 18 includes one or more modules 38, each of which is implemented in software. The module(s) 38 operate to provide the functionality of the wireless device 18 according to any of the embodiments described herein. For example, in some embodiments, the module(s) 38 include a reception module operable to receive the TA indication(s) from the base station 12 (or the base station 12-1 or 12-2), an uplink LBT module operable to perform uplink LBT on an LBT cell according to the indicated TA for uplink LBT, and an uplink transmission module operable to perform uplink transmission on the LBT, assuming successful LBT, via an associated transceiver (not shown) of the wireless device 18.

While various embodiments are described herein, some exemplary embodiments are as follows.

Embodiment 1

A method of operation of a radio access node in a cellular communications network, comprising:
  sending (100), to a wireless device, an indication of a TA for uplink LBT for an LBT cell.

Embodiment 2

The method of embodiment 1 wherein the TA for uplink LBT is configured such that at least part of an uplink LBT duration for an uplink LBT procedure performed by the wireless device falls within a one-way propagation delay between a radio access node providing the LBT cell and the wireless device.

Embodiment 3

The method of embodiment 1 or 2 wherein the TA for uplink LBT is configured such that at least part of an uplink LBT duration for an uplink LBT procedure performed by the wireless device falls within a time period having a duration that is equal to the one-way propagation delay between the radio access node providing the LBT cell and the wireless device ($T_1$) starting at the beginning of the last downlink subframe in a downlink burst on the LBT cell.

Embodiment 4

The method of embodiment 3 wherein the TA for uplink LBT is equal to $D+T_1$, wherein D is a duration of the last downlink subframe in the downlink burst on the LBT cell.

Embodiment 5

The method of embodiment 4 wherein the last downlink subframe in the downlink burst is a the last downlink subframe immediately proceeding a desired uplink transmission by the wireless device, and the wireless device is not scheduled for data reception in the last downlink subframe.

Embodiment 6

The method of embodiment 4 wherein the last downlink subframe in the downlink burst is a the last downlink subframe immediately proceeding a desired uplink transmission by the wireless device, the wireless device is scheduled for data reception in the last downlink subframe, and the TA for UL LBT is such that the wireless device does not begin uplink transmission, assuming successful uplink LBT, until reception of the downlink burst at the wireless device is complete.

Embodiment 7

The method of embodiment 3 wherein:
sending (100) the indication of the TA for uplink LBT for the LBT cell comprises sending the indication of the TA for uplink LBT for the LBT cell on a first carrier; and
the LBT cell is on a second carrier that is different than the first carrier.

Embodiment 8

The method of embodiment 7 wherein the TA for uplink LBT is equal to $D+T_1$, wherein D is a duration of the last downlink subframe in the downlink burst on the LBT cell.

Embodiment 9

The method of embodiment 1 or 2 wherein the TA for uplink LBT is configured such that at least part of an uplink LBT duration for an uplink LBT procedure performed by the wireless device falls within a time period of duration $T_1$ (i.e., the one-way propagation delay between the radio access node providing the LBT cell and the wireless device) starting after reception, at the wireless device, of the last partial downlink subframe in a downlink burst on the LBT cell.

Embodiment 10

The method of any of embodiments 1-9 further comprising sending (100), to the wireless device, an indication of a separate TA for uplink transmission on the LBT cell.

Embodiment 11

A radio access node for a cellular communications network, the radio access node adapted to operate according any of the methods of embodiments 1-10.

Embodiment 12

A method of operation of a wireless device in a cellular communications network, comprising:
receiving (104), from a radio access node, an indication of a TA for uplink LBT for an LBT cell; and
performing (108) an uplink LBT procedure for the LBT cell according to the TA for uplink LBT.

Embodiment 13

The method of embodiment 12 wherein the TA for uplink LBT is configured such that at least part of a uplink LBT duration for the uplink LBT procedure performed by the wireless device falls within a one-way propagation delay between a radio access node providing the LBT cell and the wireless device.

Embodiment 14

The method of embodiment 12 or 13 wherein the TA for uplink LBT is such that at least part of an uplink LBT duration for the uplink LBT procedure performed by the wireless device falls within a time period having a duration that is equal to the one-way propagation delay between the radio access node providing the LBT cell and the wireless device ($T_1$) starting at the beginning of the last downlink subframe in a downlink burst on the LBT cell.

Embodiment 15

The method of embodiment 14 wherein the TA for uplink LBT is equal to $D+T_1$, wherein D is a duration of the last downlink subframe in the downlink burst on the LBT cell.

Embodiment 16

The method of embodiment 15 wherein the last downlink subframe in the downlink burst is a the last downlink subframe immediately proceeding a desired uplink transmission by the wireless device, and the wireless device is not scheduled for data reception in the last downlink subframe.

Embodiment 17

The method of embodiment 15 wherein the last downlink subframe in the downlink burst is a the last downlink subframe immediately proceeding a desired uplink transmission by the wireless device, the wireless device is scheduled for data reception in the last downlink subframe, and the TA for uplink LBT is such that the wireless device does not begin uplink transmission, assuming successful UL LBT, until reception of the downlink burst at the wireless device is complete.

Embodiment 18

The method of embodiment 14 wherein:
receiving (104) the indication of the TA for uplink LBT for the LBT cell comprises receiving the indication of the TA for uplink LBT for the LBT cell on a first carrier; and
the LBT cell is on a second carrier that is different than the first carrier.

Embodiment 19

The method of embodiment 18 wherein the TA for uplink LBT is equal to $D+T_1$, wherein D is a duration of the last downlink subframe in the downlink burst on the LBT cell.

Embodiment 20

The method of embodiment 12 or 13 wherein the TA for uplink LBT is configured such that at least part of an uplink LBT duration for an uplink LBT procedure performed by the wireless device falls within a time period of duration $T_1$ (i.e., the one-way propagation delay between the radio access node providing the LBT cell and the wireless device)

starting after reception, at the wireless device, of the last partial downlink subframe in a downlink burst on the LBT cell.

Embodiment 21

The method of any of embodiments 12-20 further comprising receiving (104), from the radio access node, an indication of a separate TA for uplink transmission on the LBT cell.

Embodiment 22

A wireless device enabled to operate in a cellular communications network, the wireless device adapted to operate according any of the methods of embodiments 12-21.

The following acronyms are used throughout this disclosure.
- µs Microsecond
- 3GPP Third Generation Partnership Project
- 5G Fifth Generation
- ACK Acknowledgement
- ASIC Application Specific Integrated Circuit
- CA Carrier Aggregation
- CC Component Carrier
- CCA Clear Channel Assessment
- CFI Control Format Indicator
- CPU Central Processing Unit
- CRC Cyclic Redundancy Check
- C-RNTI Cell Radio Network Temporary Identity
- CRS Cell Specific Reference Symbol
- CSMA/CA Carrier Sense Multiple Access with Collision Avoidance
- CW Contention Window
- DCI Downlink Control Information
- DFT Discrete Fourier Transform
- DIFS Distributed Inter-Frame Space
- DMRS Demodulation Reference Signal
- DRS Dedicated Reference Signal
- eNB Enhanced or Evolved Node B
- EPC Evolved Packet Core
- EPDCCH Enhanced Physical Downlink Control Channel
- FDD Frequency Division Duplexing
- FDMA Frequency Division Multiple Access
- FPGA Field Programmable Gate Array
- GHz Gigahertz
- HARQ Hybrid Automatic Repeat Request
- km Kilometer
- LAA License Assisted Access
- LBT Listen-Before-Talk
- LTE Long Term Evolution
- LTE-U Long Term Evolution in Unlicensed Spectrum
- MHz Megahertz
- ms Millisecond
- MTC Machine Type Communication
- NACK Negative Acknowledgement
- OFDM Orthogonal Frequency Division Multiplexing
- PCell Primary Cell
- PDCCH Physical Downlink Control Channel
- PUCCH Physical Uplink Control Channel
- PUSCH Physical Uplink Shared Channel
- Rel Release
- RF Radio Frequency
- SCell Secondary Cell
- SC-FDMA Single Carrier Frequency Division Multiple Access
- SRS Sounding Reference Signal
- TA Timing Advance
- UE User Equipment
- WLAN Wireless Local Area Network Those skilled in the art will recognize improvements and modifications to the embodiments of the present disclosure. All such improvements and modifications are considered within the scope of the concepts disclosed herein.

What is claimed is:

1. A method of operation of a radio access node in a cellular communications network, comprising:
transmitting an indication of a Timing Advance, TA, for uplink Listen-Before-Talk, LBT, for an LBT cell to be used by a wireless device;
wherein the TA for uplink LBT is such that at least part of an uplink LBT duration for an uplink LBT procedure performed by the wireless device falls within a time period having a duration that is equal to a one-way propagation delay, $T_1$, between a radio access node providing the LBT cell and the wireless device, the time period starting at a time of transmission of a last downlink subframe in a downlink burst on the LBT cell at the radio access node providing the LBT cell.

2. The method of claim 1 wherein the TA for uplink LBT for the LBT cell is a TA for both uplink LBT and uplink transmission for the LBT cell.

3. The method of claim 1 further comprising sending, to the wireless device, an indication of a TA for uplink transmission on the LBT cell.

4. The method of claim 1 wherein the TA for uplink LBT is equal to $D+T_1$, wherein D is a duration of the last downlink subframe in the downlink burst on the LBT cell.

5. The method of claim 4 wherein the last downlink subframe in the downlink burst is a last downlink subframe immediately preceding a desired uplink transmission by the wireless device, and the wireless device is not scheduled for data reception in the last downlink subframe.

6. The method of claim 4 wherein:
the last downlink subframe in the downlink burst is a last downlink subframe immediately preceding a desired uplink transmission by the wireless device;
the wireless device is scheduled for data reception in the last downlink subframe; and
the wireless device does not begin uplink transmission, assuming successful uplink LBT, until reception of the downlink burst at the wireless device is complete.

7. The method of claim 1 wherein:
sending the indication of the TA for uplink LBT for the LBT cell comprises sending the indication of the TA for uplink LBT for the LBT cell on a first carrier; and
the LBT cell is on a second carrier that is different than the first carrier.

8. The method of claim 7 wherein the TA for uplink LBT is equal to $D+T_1$, wherein D is a duration of the last downlink subframe in the downlink burst on the LBT cell.

9. A radio access node for a cellular communications network, the radio access node adapted to:
transmit an indication of a Timing Advance, TA, for uplink Listen-Before-Talk, LBT, for an LBT cell to be used by a wireless device;
wherein the TA for uplink LBT is such that at least part of an uplink LBT duration for an uplink LBT procedure performed by the wireless device falls within a time period having a duration that is equal to a one-way propagation delay, $T_1$, between a radio access node providing the LBT cell and the wireless device, the time period starting at a time of transmission of a last downlink subframe in a downlink burst on the LBT cell at the radio access node providing the LBT cell.

10. A radio access node for a cellular communications network, comprising:
at least one processor; and
memory comprising instructions executable by the at least one processor whereby the radio access node is operable to:
effect transmitting an indication of a Timing Advance, TA, for uplink Listen-Before-Talk, LBT, for an LBT cell to be used by a wireless device;
wherein the TA for uplink LBT is such that at least part of an uplink LBT duration for an uplink LBT procedure performed by the wireless device falls within a time period having a duration that is equal to a one-way propagation delay, $T_1$, between a radio access node providing the LBT cell and the wireless device, the time period starting at a time of transmission of a last downlink subframe in a downlink burst on the LBT cell at the radio access node providing the LBT cell.

11. A method of operation of a wireless device in a cellular communications network, comprising:
receiving, from a radio access node, an indication of a Timing Advance, TA, for uplink Listen-Before-Talk, LBT, for an LBT cell; and
performing an uplink LBT procedure for the LBT cell according to the TA for uplink LBT;
wherein the TA for uplink LBT is such that at least part of an uplink LBT duration for the uplink LBT procedure performed by the wireless device falls within a time period having a duration that is equal to a one-way propagation delay, $T_1$, between the radio access node providing the LBT cell and the wireless device, the time period starting at a time of transmission of a last downlink subframe in a downlink burst on the LBT cell at the radio access node providing the LBT cell and ending at a time of receipt of the last downlink subframe in the downlink burst on the LBT cell at the wireless device.

12. The method of claim 11 further comprising receiving, from the radio access node, an indication of a separate TA for uplink transmission on the LBT cell.

13. The method of claim 11 wherein the TA for uplink LBT is equal to $D+T_1$, wherein D is a duration of the last downlink subframe in the downlink burst on the LBT cell.

14. The method of claim 13 wherein the last downlink subframe in the downlink burst is a last downlink subframe immediately preceding a desired uplink transmission by the wireless device, and the wireless device is not scheduled for data reception in the last downlink subframe.

15. The method of claim 13 wherein the last downlink subframe in the downlink burst is a last downlink subframe immediately preceding a desired uplink transmission by the wireless device,
the wireless device is scheduled for data reception in the last downlink subframe; and
the wireless device does not begin uplink transmission, assuming successful uplink LBT, until reception of the downlink burst at the wireless device is complete.

16. The method of claim 11 wherein:
receiving the indication of the TA for uplink LBT for the LBT cell comprises receiving the indication of the TA for uplink LBT for the LBT cell on a first carrier; and
the LBT cell is on a second carrier that is different than the first carrier.

17. The method of claim 16 wherein the TA for uplink LBT is equal to $D+T_1$, wherein D is a duration of the last downlink subframe in the downlink burst on the LBT cell.

18. A wireless device enabled to operate in a cellular communications network, the wireless device adapted to:
receive, from a radio access node, an indication of a Timing Advance, TA, for uplink Listen-Before-Talk, LBT, for an LBT cell; and
perform an uplink LBT procedure for the LBT cell according to the TA for uplink LBT;
wherein the TA for uplink LBT is such that at least part of an uplink LBT duration for the uplink LBT procedure performed by the wireless device falls within a time period having a duration that is equal to a one-way propagation delay, $T_1$, between a radio access node providing the LBT cell and the wireless device, the time period starting at a time of transmission of a last downlink subframe in a downlink burst on the LBT cell at the radio access node providing the LBT cell.

19. A wireless device for a cellular communications network, comprising:
at least one processor; and
memory comprising instructions executable by the at least one processor whereby the wireless device is operable to:
receive, from a radio access node, an indication of a Timing Advance, TA, for uplink Listen-Before-Talk, LBT, for an LBT cell; and
perform an uplink LBT procedure for the LBT cell according to the TA for uplink LBT;
wherein the TA for uplink LBT is such that at least part of an uplink LBT duration for the uplink LBT procedure performed by the wireless device falls within a time period having a duration that is equal to a one-way propagation delay, $T_1$, between a radio access node providing the LBT cell and the wireless device, the time period starting at a time of transmission of a last downlink subframe in a downlink burst on the LBT cell at the radio access node providing the LBT cell.

* * * * *